US012743828B2

(12) United States Patent
Burgert et al.

(10) Patent No.: US 12,743,828 B2
(45) Date of Patent: Sep. 22, 2026

(54) GENERATING AN ALPHA IMAGE BASED ON A TEXT PROMPT

(71) Applicant: ADOBE INC., San Jose, CA (US)

(72) Inventors: Ryan Burgert, Port Jefferson, NY (US); Brian Lynn Price, Grove, UT (US); Yijun Li, Seattle, WA (US); Jason Wen Yong Kuen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 141 days.

(21) Appl. No.: 18/416,341

(22) Filed: Jan. 18, 2024

(65) Prior Publication Data

US 2025/0238982 A1 Jul. 24, 2025

(51) Int. Cl.

*G06T 11/60* (2026.01)
*G06T 5/50* (2006.01)
*G06T 7/194* (2017.01)
*G06T 7/90* (2017.01)
*G06V 10/56* (2022.01)

(52) U.S. Cl.

CPC ................ *G06T 11/60* (2013.01); *G06T 5/50* (2013.01); *G06T 7/194* (2017.01); *G06T 7/90* (2017.01); *G06V 10/56* (2022.01); *G06T 2207/10024* (2013.01); *G06T 2207/20081* (2013.01); *G06T 2207/20221* (2013.01)

(58) Field of Classification Search

None

See application file for complete search history.

(56) References Cited

U.S. PATENT DOCUMENTS

2010/0066753 A1* 3/2010 Branham ............... G03B 21/32 345/589
2023/0368504 A1* 11/2023 Aidt ....................... G06V 10/82
2023/0388845 A1* 11/2023 Horn ................. H04W 72/0473
2024/0037812 A1* 2/2024 Zalewski ............... G06V 10/56
2024/0135611 A1* 4/2024 Costin ..................... G06T 11/60

FOREIGN PATENT DOCUMENTS

CN 108596913 A * 9/2018 ............. G06T 7/194
CN 113409221 A * 9/2021 ............... G06T 7/90
CN 114037710 A * 2/2022 ............. G06N 3/045
WO WO-2024038114 A1 * 2/2024 ............. G06N 3/045

OTHER PUBLICATIONS

Smith AR, Blinn JF. Blue screen matting. InProceedings of the 23rd annual conference on Computer graphics and interactive techniques Aug. 1, 1996 (pp. 259-268). (Year: 1996).*

(Continued)

*Primary Examiner* — Zhengxi Liu

(74) *Attorney, Agent, or Firm* — F. CHAU & ASSOCIATES, LLC

(57) ABSTRACT

A method, apparatus, non-transitory computer readable medium, and system for image generation includes obtaining a text prompt describing an object and a keyable background and generating an image including the object and the keyable background based on the text prompt. Some embodiments generate an alpha image by replacing the keyable background with an alpha channel.

16 Claims, 21 Drawing Sheets

(56) References Cited

OTHER PUBLICATIONS

Maul, Pascale. "A Deep Learning Approach to Color Spill Suppression in Chroma Keying." 2019 (Year: 2019).*
2Alemohammad, et al., "Self-Consuming Generative Models Go MAD", arXiv preprint arXiv:2307.01850v1 [cs.LG] Jul. 4, 2023, 31 pages.
1DeepFloyd, https://github.com/deep-floyd/if, Apr. 28, 2023, 14 pages.
3Burgert, et al., "Peekaboo: Text to Image Diffusion Models are Zero-Shot Segmentors", arXiv preprint arXiv:2211.13224v2 [cs.CV] Jun. 21, 2023, 25 pages.
4Cai, et al., "Disentangled Image Matting", arXiv preprint arXiv:1909.04686v1 [cs.CV] Sep. 10, 2019, 10 pages.
5Chen, et al., "Microsoft COCO Captions: Data Collection and Evaluation Server", arXiv:1504.00325v2 [cs.CV] Apr. 3, 2015, 7 pages.
7Dai, et al., "Boosting Robustness of Image Matting with Context Assembling and Strong Data Augmentation", arXiv preprint arXiv:2201.06889v1 [cs.CV] Jan. 18, 2022, 19 pages.
6Cordts, et al., "The Cityscapes Dataset for Semantic Urban Scene Understanding", arXiv preprint arXiv:1604.01685v2 [cs.CV] Apr. 7, 2016, 29 pages.
8Erofeev, et al., "Perceptually Motivated Benchmark for Video Matting", available at https://videomatting.com/content/paper/videoMattingBenchmark.pdf, 2015, 12 pages.
9He, et al., "Mask R-CNN", arXiv preprint arXiv:1703.06870v3 [cs.CV] Jan. 24, 2018, 12 pages.
10Hugging Face, "Image-to-image", available at https://huggingface.co/docs/diffusers/api/pipelines/stable_diffusion/img2img, accessed Dec. 22, 2023, 17 pages.
11Kirillov, et al., "Panoptic Segmentation", arXiv preprint arXiv:1801.00868v3 [cs.CV] Apr. 10, 2019, 10 pages.
12Kuznetsova, et al., "The Open Images Dataset V4: Unified image classification, object detection, and visual relationship detection at scale", arXiv preprint arXiv:1811.00982v2 [cs.CV] Feb. 21, 2020, 26 pages.
13Zhang, et al., "DatasetGAN: Efficient Labeled Data Factory with Minimal Human Effort", arXiv:2104.06490v2 [cs.CV] Apr. 20, 2021, 11 pages.
14Li, et al., "Instance-Level Salient Object Segmentation", arXiv preprint arXiv:1704.03604v1 [cs.CV] Apr. 12, 2017, 10 pages.
15Li, et al., "The Secrets of Salient Object Segmentation", arXiv preprint arXiv:1406.2807v2 [cs.CV] Jun. 12, 2014, 15 pages.
16Li, et al., "Open-vocabulary Object Segmentation with Diffusion Models", arXiv preprint arXiv:2301.05221v2 [cs.CV] Aug. 10, 2023, 22 pages.
17Lin, et al., "Real-Time High-Resolution Background Matting", arXiv preprint arXiv:2012.07810v1 [cs.CV] Dec. 14, 2020, 16 pages.
18Lin, et al., "Microsoft COCO: Common Objects in Context", arXiv preprint arXiv:1405.0312v3 [cs.CV] Feb. 21, 2015, 15 pages.
19Lu, et al., "Indices Matter: Learning to Index for Deep Image Matting", arXiv preprint arXiv:1908.00672v1 [cs.CV] Aug. 2, 2019, 11 pages.
20Meng, et al., "SDEdit: Guided Image Synthesis and Editing with Stochastic Differential Equations", arXiv preprint arXiv:2108.01073v2 [cs.CV] Jan. 5, 2022, 33 pages.
21Nguyen, et al., "Dataset Diffusion: Diffusion-based Synthetic Dataset Generation for Pixel-Level Semantic Segmentation", arXiv preprint arXiv:2309.14303v4 [cs.CV] Nov. 13, 2023, 21 pages.
22Podell, et al., "SDXL: Improving Latent Diffusion Models for High-Resolution Image Synthesis", arXiv preprint arXiv:2307.01952v1 [cs.CV] Jul. 4, 2023, 21 pages.
23Qi, et al., "High-Quality Entity Segmentation", arXiv preprint arXiv:2211.05776v3 [cs.CV] Apr. 2, 2023, 11 pages.
24Qin, et al., "Highly Accurate Dichotomous Image Segmentation", arXiv preprint arXiv:2203.03041v4 [cs.CV] Jul. 15, 2022, 29 pages.
25Ramesh, et al., "Hierarchical Text-Conditional Image Generation with CLIP Latents", arXiv preprint arXiv:2204.06125v1 [cs.CV] Apr. 13, 2022, 27 pages.
26Rhemann, et al., "A Perceptually Motivated Online Benchmark for Image Matting", available at https://publik.tuwien.ac.at/files/PubDat_180666.pdf, 2009.
27Rombach, et al., "High-Resolution Image Synthesis with Latent Diffusion Models", arXiv preprint arXiv:2112.10752v2 [cs.CV] Apr. 13, 2022, 45 pages.
28Russakovsky, et al., "ImageNet Large Scale Visual Recognition Challenge", arXiv preprint arXiv:1409.0575v3 [cs.CV] Jan. 30, 2015, 43 pages.
29Saharia, et al., "Photorealistic Text-to-Image Diffusion Models with Deep Language Understanding", arXiv:2205.11487v1 [cs.CV] May 23, 2022, 46 pages.
30Sengupta, et al., "Background Matting: The World is Your Green Screen", arXiv preprint arXiv:2004.00626v2 [cs.CV] Apr. 10, 2020, 16 pages.
31Sharma, et al., "Conceptual Captions: A Cleaned, Hypernymed, Image Alt-Text Dataset For Automatic Image Captioning", in Proceedings of the 56th Annual Meeting of the Association for Computational Linguistics (Long Papers), pp. 2556-2565, Jul. 15, 2018, 10 p.
32Shen, et al., "Deep Automatic Portrait Matting", in ECCV 2016, Part I, LNCS 9905, pp. 92-107, 2016, 16 pages.
33Shumailov, et al., "The Curse of Recursion: Training on Generated Data Makes Models Forget", arXiv preprint arXiv:2305.17493v2 [cs.LG] May 31, 2023, 18 pages.
34Smith, et al., "Blue Screen Matting", in SIGGRAPH 96 Conference Proceedings, pp. 259-268, Aug. 1996, 10 pages.
35Sun, et al., "Semantic Image Matting", arXiv preprint arXiv:2104.08201v1 [cs.CV] Apr. 16, 2021, 10 pages.
36Tang, et al., "Learning-based Sampling for Natural Image Matting", in CVPR 2019, pp. 3055-3063, 2019, 9 pages.
37Wang, et al., "Video Matting via Consistency-Regularized Graph Neural Networks", available at https://faculty.ucmerced.edu/mhyang/papers/iccv2021_video_matting.pdf, 2021, 10 pages.
38Wang, et al., "Multi-Scale Structural Similarity for Image Quality Assessment", in Proceedings of the 3th IEEE Asilomar Conference on Signals, Systems and Computers, Nov. 9, 2003, 5 pages.
39Wright, "Digital Compositing for Film and Video", Third Edition, Elsevier Inc. 2010, available at https://www.sciencedirect.com/book/9780240813097/digital-compositing-for-film-and-video.
40Wu, et al., "DatasetDM: Synthesizing Data with Perception Annotations Using Diffusion Models", arXiv preprint arXiv:2308.06160v2 [cs.CV] Oct. 10, 2023, 23 pages.
41Wu, et al., "DiffuMask: Synthesizing Images with Pixel-Level Annotations for Semantic Segmentation Using Diffusion Models", arXiv preprint arXiv:2303.11681v3 [cs.CV] Dec. 19, 2023, 12 pages.
42Xie, et al., "MosaicFusion: Diffusion Models as Data Augmenters for Large Vocabulary Instance Segmentation", arXiv preprint arXiv:2309.13042v1 [cs.CV] Sep. 22, 2023, 15 pages.
43Xu, et al., "Deep Image Matting", arXiv preprint arXiv:1703.03872v3 [cs.CV] Apr. 11, 2017, 10 pages.
44Ye, et al., "SegGen: Supercharging Segmentation Models with Text2Mask and Mask2Img Synthesis", arXiv preprint arXiv:2311.03355v1 [cs.CV] Nov. 6, 2023, 19 pages.
45Young, et al., "From image descriptions to visual denotations: New similarity metrics for semantic inference over event descriptions", in Transactions of the Association for Computational Linguistics, 2 (2014), pp. 67-78, Feb. 2014, 12 pages.
46Zhang, et al., "Adding Conditional Control to Text-to-Image Diffusion Models", arXiv preprint arXiv:2302.05543v3 [cs.CV] Nov. 26, 2023, 12 pages.
47Zhang, et al., "Attention-guided Temporally Coherent Video Object Matting", arXiv preprint arXiv:2105.11427v3 [cs.CV] Jul. 29, 2021, 10 pages.
48Li, et al., "BigDatasetGAN: Synthesizing ImageNet with Pixel-wise Annotations", arXiv preprint arXiv:2201.04684v1 [cs.CV] Jan. 12, 2022, 21 pages.

(56) References Cited

OTHER PUBLICATIONS

49Zhou, et al., "Scene Parsing through ADE20K Dataset", available at https://people.csail.mit.edu/bzhou/publication/scene-parse-camera-ready.pdf, Aug. 18, 2017, 9 pages.

* cited by examiner

525
"dandelions against a solid blue background"

545
"submarine isolated on a solid green background"

GENERATING AN ALPHA IMAGE BASED ON A TEXT PROMPT

BACKGROUND

The following relates generally to machine learning, and more specifically to image generation using a machine learning model. Machine learning algorithms build a model based on sample data, known as training data, to make a prediction or a decision in response to an input without being explicitly programmed to do so. One area of application for machine learning is image generation.

For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

SUMMARY

Embodiments of the present disclosure provide an image generation system including an image generation model and a matting component. According to some aspects, the image generation system obtains a text prompt describing a foreground element and an algorithmically replaceable background. In some cases, the image generation system uses an image generation model to generate an image depicting the foreground element against the background, and uses a matting component to replace the background with an alpha channel to obtain an alpha image.

In some cases, by generating the image using the image generation model, aspects of the present disclosure provide a keyable image in a more efficient and accurate manner than conventional techniques for generating keyable images. Furthermore, in some cases, by generating the alpha image based on the text prompt, the image generation apparatus allows any user, including a non-expert user, to more quickly and efficiently generate a user-specified object isolated against a transparent background than conventional systems and techniques.

A method, apparatus, non-transitory computer readable medium, and system for image generation are described. One or more aspects of the method, apparatus, non-transitory computer readable medium, and system include obtaining a text prompt describing an object and a keyable background; generating an image including the object and the keyable background based on the text prompt; and generating an alpha image by replacing the keyable background with an alpha channel.

A method, apparatus, non-transitory computer readable medium, and system for image generation are described. One or more aspects of the method, apparatus, non-transitory computer readable medium, and system include creating a training dataset including a training image and a training prompt, wherein the training image depicts an object and a keyable background and training an image generation model to generate images with keyable backgrounds based on the training image and the training prompt.

An apparatus, system, and method for image generation are described. One or more aspects of the apparatus, system, and method include at least one memory component; at least one processor executing instructions stored in the at least one memory component; an image generation model comprising parameters stored in the at least one memory component, the image generation model trained to generate an image including an object and a keyable background based on a text prompt describing the object and the keyable background; and a matting component configured to generate an alpha image by replacing the keyable background with an alpha channel.

BRIEF DESCRIPTION OF THE DRAWINGS

FIG. 21 shows an example of a computing device according to aspects of the present disclosure.

DETAILED DESCRIPTION

Figure 1:
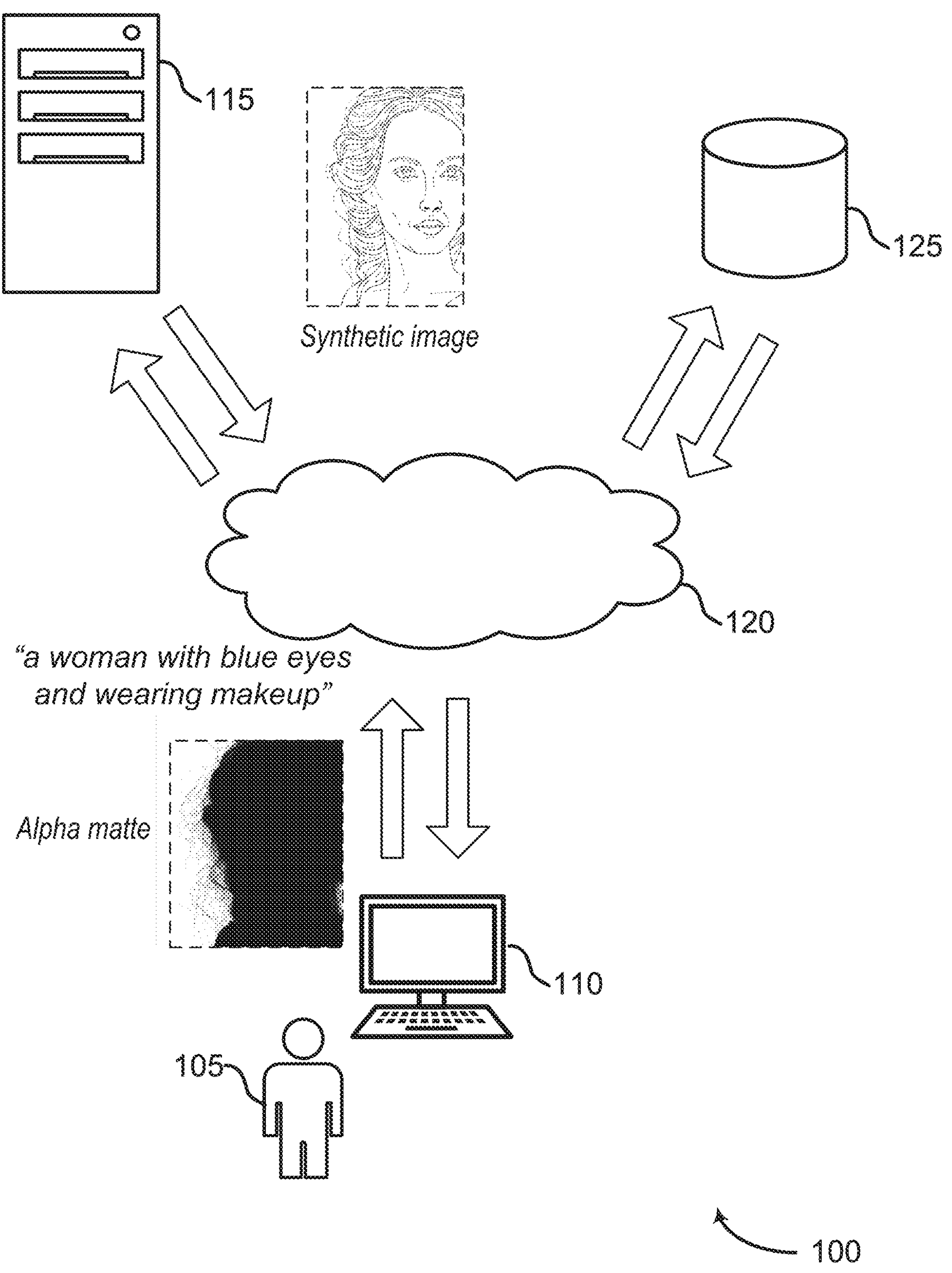
FIG. 1 shows an example of an image generation system according to aspects of the present disclosure.

A machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

Images of objects isolated against transparent backgrounds are useful for downstream image generation tasks, such as image compositing or image generation model training. While various methods exist for isolating an object from a remainder of any image, the isolation is most easily, accurately, and efficiently accomplished when the background is uniform and differentiable from the object, such that the background may be algorithmically replaced.

Conventional image generation models do not consistently produce images including an algorithmically removable background. For example, conventional image generation models tend to generate backgrounds that are too dark, desaturated, or graded to be identified and removed using a removal algorithm that works on the basis of color identification, or tend to generate backgrounds that are insufficiently color-isolated from a target object, or tend to generate images that include additional unwanted background objects in addition to a target object. Therefore, conventional image generation models do not produce images that are suitable for efficient background-removal processing to obtain alpha images.

Embodiments of the present disclosure provide an image generation system including an image generation model and a matting component. According to some aspects, the image generation system obtains a text prompt describing a foreground element (e.g., an object) and an algorithmically replaceable background (e.g., a keyable background). In some cases, the image generation system uses an image generation model to generate an image depicting the foreground element against the background, and uses a matting component to replace the background with an alpha channel to obtain an alpha image.

In some cases, by generating the image using the image generation model, aspects of the present disclosure provide a keyable image in a more efficient and accurate manner than conventional techniques for generating keyable images. Furthermore, in some cases, by generating the alpha image based on the text prompt, the image generation apparatus allows any user, including a non-expert user, to more quickly and efficiently generate a user-specified object isolated against a transparent background than conventional systems and techniques. Furthermore, in some cases, because the alpha image is generated based on an image including a keyable background, the alpha image is able to include fine details (such as hair) or transparencies (such as glass) in the object which conventional image generation systems and techniques do not provide.

In some cases, the image generation system obtains the text prompt by determining a least common color included in a preliminary image depicting the object, and generating the text prompt to include a description of the least common color as the description of the keyable background. Accordingly, in some cases, because the image is then generated based on the text prompt, the image generation system provides a more accurate and efficient manner of determining and providing a keyable background for a target object than conventional image generation systems.

According to some aspects, the image generation model is trained to generate images with keyable backgrounds based on a training image and a training prompt, where the training image depicts an object and a keyable background. In some cases, by training the image generation model based on the training image and the training prompt, aspects of the present disclosure provide an image generation model capable of generating an image including keyable background in a more consistent manner than conventional image generation models.

Furthermore, conventional image generation machine learning models, such as diffusion models, do not themselves generate images including accurate alpha channels. While segmentation maps have been used to guide diffusion models, the segmentation maps are rough and do not contain precise details (such as human hair) or transparencies (such as in a wine glass). The inability of current methods to address a direct generation of alpha images using a conventional image generation model may be due to a lack of training data. While many large-scale segmentation training datasets exist, the existing training datasets do not include accurate soft boundaries, in some cases because the existing training datasets include data that is segmented manually using boundary-tracing tools. Matting datasets exist that contain high-quality alpha ground-truths, but are too small for training image generation models due to a difficulty in obtaining the ground-truth alpha. Without a suitable large-scale alpha dataset, training image generation models with accurate boundaries is difficult.

According to some aspects, because the alpha image is generated based on the output of an image generation model, a large quantity of alpha images suitable for training a downstream image generation model for downstream image generation tasks relating to isolated image foreground elements and alpha values can be produced.

An aspect of the present disclosure is used in a downstream image generation context. For example, a user wants to generate an image such that generated content of the image fits within a masked area. The user provides a text prompt and an alpha matte outlining an opaque area and a transparent area to the image generation system. The image generation system uses a downstream image generation model that has been trained based on an alpha image generated by the image generation system to generate an image based on the text prompt and the alpha matte. Because the downstream image generation model has been trained based on the alpha image, the downstream image generation model generates content within an area marked out by the opaque area of the alpha matte while avoiding generating content within an area marked out by the transparent area of the alpha matte.

Figure 2:
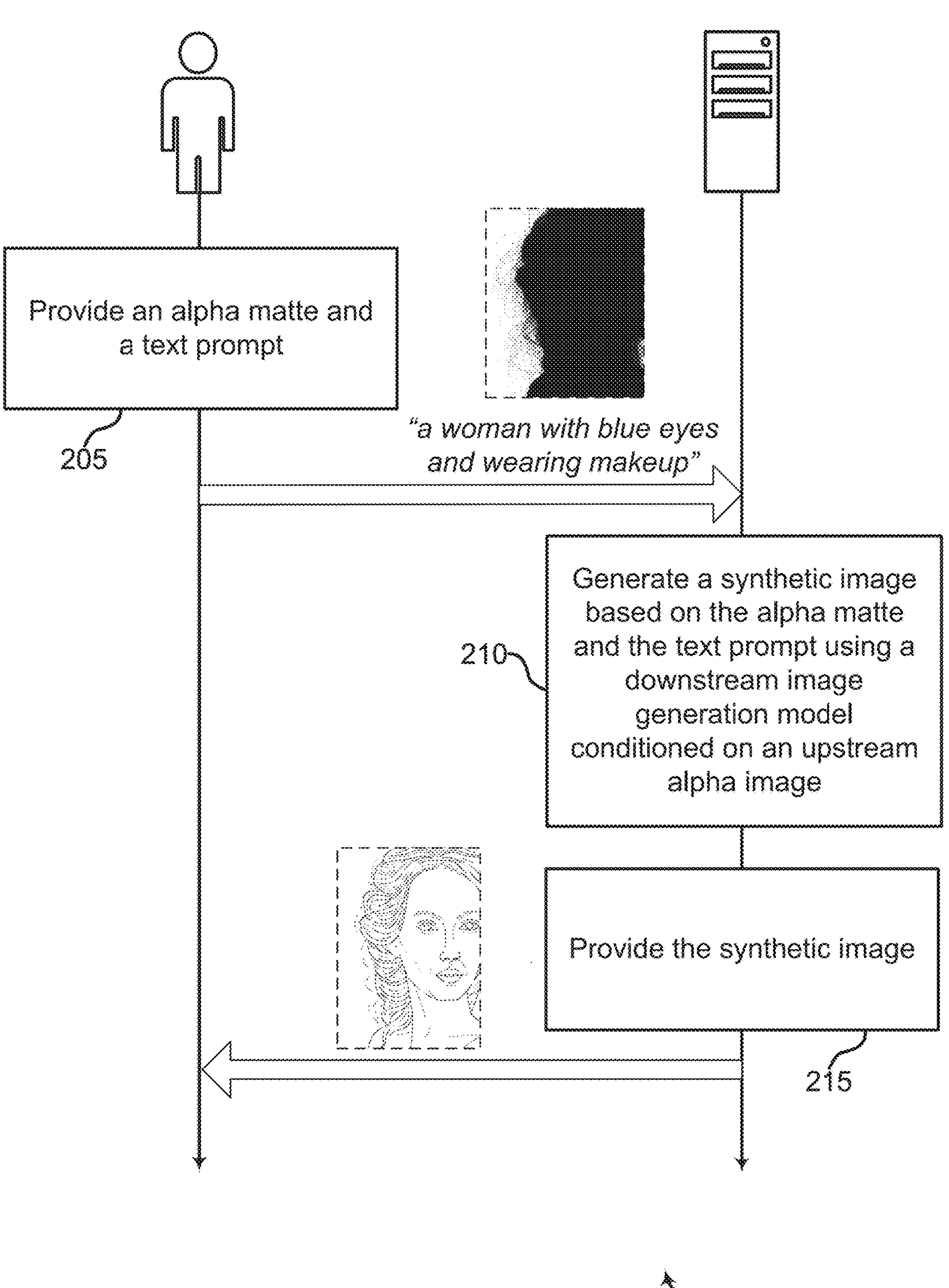
FIG. 2 shows an example of a method for generating a synthetic image according to aspects of the present disclosure.

Further example applications of the present disclosure in a downstream image generation context are provided with reference to FIGS. 1-2. Details regarding the architecture of the image generation system are provided with reference to FIGS. 1-10 and 21. Examples of a process for image generation are provided with reference to FIGS. 11-17. Examples of a process for training an image generation model are provided with reference to FIGS. 18-20.

Embodiments of the present disclosure improve upon conventional image generation systems by generating an image including an object and a keyable background, which allows a matting component to accurately and efficiently replace the keyable background with an alpha channel to obtain an alpha image. By contrast, conventional image generation systems do not consistently generate images having a keyable background using machine learning, and so more effort and resources are required by conventional image generation systems to produce usable alpha images.

Image Generation System

A system and an apparatus for image generation is described with reference to FIGS. 1-10 and 21. One or more aspects of the system and the apparatus include at least one memory component; at least one processor executing instructions stored in the at least one memory component; an image generation model comprising parameters stored in the at least one memory component, the image generation model trained to generate an image including an object and a keyable background based on a text prompt describing the object and the keyable background; and a matting component configured to generate an alpha image by replacing the keyable background with an alpha channel.

Some examples of the system and the apparatus further include a color analysis component configured to determine the keyable background based on a color analysis of a preliminary image depicting the object. Some examples of the system and the apparatus further include a prompt generation component configured to modify a preliminary text prompt with a description of the keyable background to obtain the text prompt, wherein the preliminary text prompt describes the object and a preliminary background.

In some aspects, the matting component includes a selection component configured to select an output from one of a plurality of matting algorithms as the alpha image. Some examples of the system and the apparatus further include a training component configured to train the image generation model using a training image including a training keyable background.

FIG. 1 shows an example of an image generation system 100 according to aspects of the present disclosure. In one aspect, image generation system 100 includes user 105, user device 110, image generation apparatus 115, cloud 120, and database 125.

In the example of FIG. 1, user 105 provides a text prompt "a woman with blue eyes and wearing makeup" and an alpha matte to image generation apparatus 115 via a user interface provided on user device 110 by image generation apparatus 115. As used herein, an "alpha matte" refers to a grayscale representation of an alpha channel of an image. In some cases, as used herein, an "alpha channel" refers to transparency information of an image. In some cases, an alpha matte is used as a layer of an image that indicates transparent areas of that layer or another layer, where white indicates opaque or semi-opaque areas and black indicates transparent areas. As shown in FIG. 1, the black and white colors of the alpha matte are inverted for ease of illustration.

In some cases, image generation apparatus 115 uses a downstream image generation model (such as the additional image generation model described with reference to FIG. 7) to generate a synthetic image based on the text prompt and the alpha matte, such that the image includes synthetic (e.g., generated) content described by the text prompt only within an area corresponding to the opaque area of the alpha matte. In some cases, the synthetic image is an example of an additional image as described with reference to FIG. 20. In some cases, the downstream image generation model is trained based on an alpha image output by an upstream image generation process using an image generation model of image generation apparatus 115 (such as the image generation model described with reference to FIGS. 7-8), such that the downstream image generation model learns to generate images that include generated content only within opaque areas of input alpha mattes.

As used herein, an "alpha image" refers to an image that includes an alpha channel. In some cases, an alpha image also includes one or more color channels including corresponding color information of the image (such as a red channel, a blue channel, a green channel, or a combination thereof). In some cases, an alpha image refers to an RGBA image, where "RGB" indicates respective color channels and "A" indicates an alpha channel.

In some cases, the alpha image is generated by replacing a keyable background with an alpha channel. As used herein, in some cases, a "keyable background" refers to an image background that is capable of being separated from an image foreground element (such as an object) according to a computer-implemented algorithm.

In the example of FIG. 1, image generation apparatus 115 provides the synthetic image to user 105 via the user interface provided on user device 110. According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows information (such as an image, a prompt, user inputs, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 7-8 and 21. According to some aspects, image generation apparatus 115 includes a computer-implemented network. In some embodiments, the computer-implemented network includes a machine learning model (such as the image generation model described with reference to FIGS. 7-8 and/or the additional image generation model described with reference to FIG. 7). In some embodiments, image generation apparatus 115 also includes one or more processors, a memory subsystem, a communication interface, an I/O interface, one or more user interface components, and a bus as described with reference to FIG. 22. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 1-10 and 21. Further detail regarding a process for image generation is provided with reference to FIGS. 11-17. Examples of a process for training a machine learning model are provided with reference to FIGS. 18-20.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for generating a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to some aspects, an image generation apparatus (such as the image generation apparatus described with reference to FIGS. 1, 7-8, and 21) provides a downstream image generation model (such as the additional image generation model described with reference to FIG. 7) trained based on an alpha image that is output by an upstream alpha image generation process (such as the alpha image generation process described with reference to FIGS. 11-17), where the upstream alpha image generation process uses an image generation model (such as the image generation model described with reference to FIGS. 7-8) trained to generate an image depicting an object against a keyable background.

The alpha image produced by the image generation process is suitable for downstream image processing tasks (such as easily compositing an object depicted in the alpha image into another image, as the background of the alpha image is transparent) and/or for training downstream image generation models to perform tasks such as generating an image based on an input alpha matte, or directly generating an alpha image based on a prompt describing the alpha image.

Referring to FIG. 2, a downstream image generation model trained based on an alpha image is used to generate a synthetic image based on an input alpha matte.

At operation 205, a user (such as the user described with reference to FIG. 1) provides an alpha matte and a text prompt to the image generation apparatus. As shown in FIG. 2, the alpha matte (with colors reversed for ease of illustration) includes an opaque area and a transparent area. In some cases, the user provides the alpha matte to the image generation apparatus via a user interface (such as a graphical user interface) provided on a user device by the image generation apparatus (as described with reference to FIG. 1). In some cases, the text prompt describes content to be generated within an area corresponding to the opaque area.

At operation 210, the system generates a synthetic image based on the alpha matte and the text prompt using the downstream image generation model, where the downstream image generation model is conditioned on an upstream alpha image provided by the upstream alpha image generation process. In some cases, the operations of this step refer to, or may be performed by, an image generation apparatus as described with reference to FIGS. 1, 7-8, and 21.

In some cases, the upstream alpha image generation process is described with reference to FIGS. 11-17. In some cases, the downstream image generation model (such as a diffusion model) is conditioned as described with reference to FIGS. 18-20. For example, in some cases, the downstream image generation model is conditioned based on the alpha image to use an alpha matte as guidance for an image generation process, such that a synthetic image generated by the conditioned process includes synthetic content described by a prompt (such as the text prompt) only in an area corresponding to the opaque area of the alpha matte. In some cases, the synthetic image is an additional image as described with reference to FIG. 20.

At operation 215, the system provides the synthetic image to the user. In some cases, the operations of this step refer to, or may be performed by, an image generation apparatus as described with reference to FIGS. 1, 7-8, and 21. For example, in some cases, the image generation apparatus displays the synthetic image to the user via the user interface.

Figure 3:
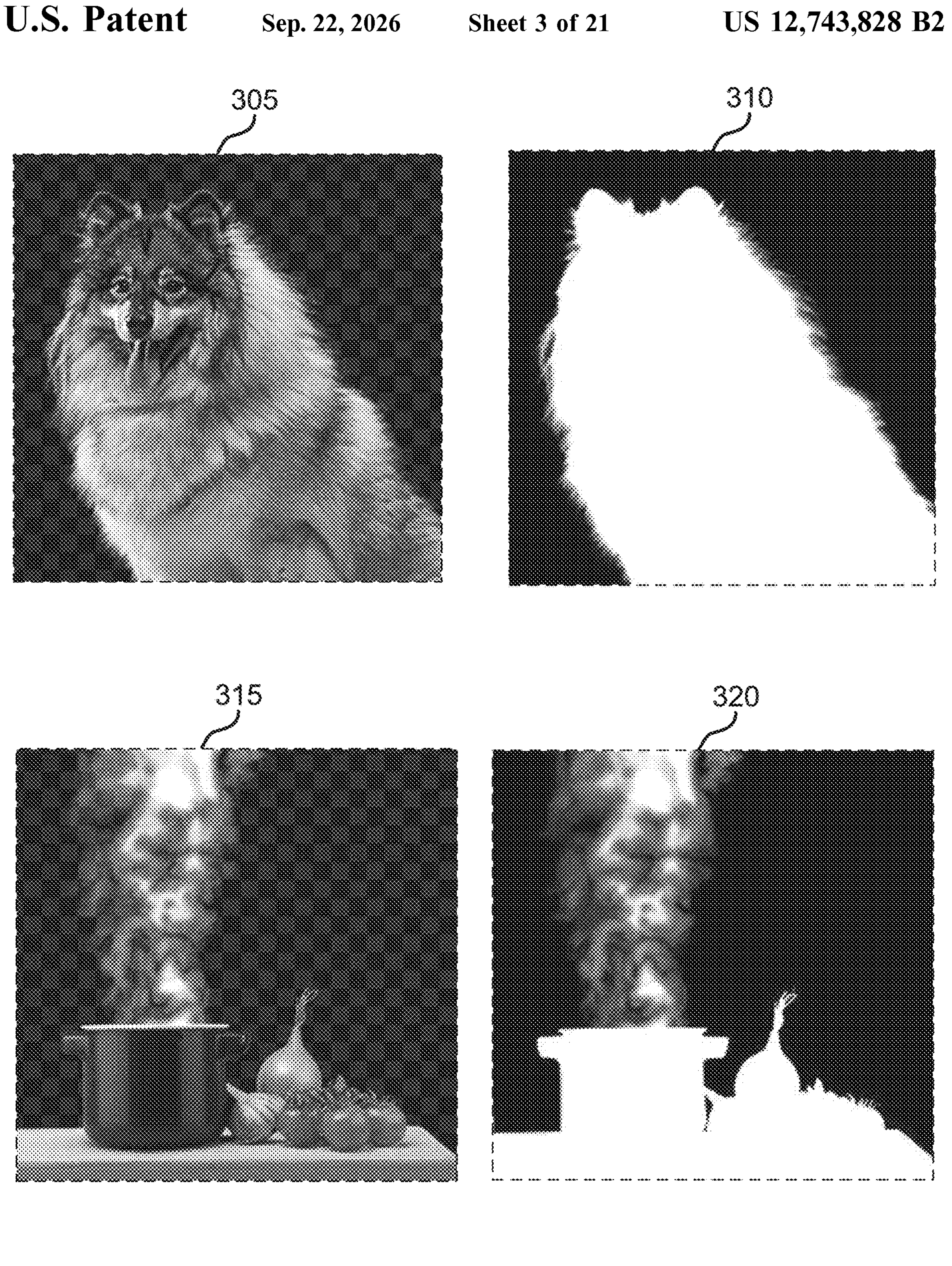
FIG. 3 shows an example of alpha images according to aspects of the present disclosure.

FIG. 3 shows an example 300 of alpha images according to aspects of the present disclosure. The example shown includes first alpha image 305, first alpha matte 310, second alpha image 315, and second alpha matte 320. First alpha image 305 and second alpha image 315 are examples of, or include aspects of, the corresponding elements described with reference to FIGS. 4, 8, 12, and 15. First alpha matte 310 and second alpha matte 320 are examples of, or include aspects of, the corresponding elements described with reference to FIGS. 4 and 12.

Referring to FIG. 3, each of first alpha image 305 and second alpha image 315 are generated based on an image including a keyable background (such as the images described with reference to FIG. 5) and are RGBA images that depict one or more solid objects (e.g., foreground elements) against a transparent background (here, represented by a checkered background). First alpha matte 310 and second alpha matte 320 are grayscale representations of alpha channels of first alpha image 305 and second alpha image 315, respectively, where black indicates a transparent area, white indicates an opaque area, and grayscale values between black and white indicate corresponding semi-transparent areas.

As shown in FIG. 3, an alpha image generation process according to aspects of the present disclosure allows fine details to be preserved in generated alpha images. For example, as shown in first alpha image 305 and first alpha matte 310, detailed dog fur edges are preserved against the transparent background, and as shown in second alpha image 315 and second alpha matte 320, a semi-transparency of steam rising from a pot is preserved against the transparent background.

Figure 4:
FIG. 4 shows a further example of alpha images according to aspects of the present disclosure.

FIG. 4 shows an example 400 of additional alpha images according to aspects of the present disclosure. The example shown includes first alpha images 405, first alpha mattes 410, second alpha images 415, and second alpha mattes 420. First alpha images 405 and second alpha images 415 are examples of, or include aspects of, the corresponding elements described with reference to FIGS. 3, 8, 12, and 15. First alpha mattes 310 and second alpha mattes 320 are examples of, or include aspects of, the corresponding elements described with reference to FIGS. 3 and 12.

As shown in FIG. 4, each of first alpha images 405 and second alpha images 415 are RGBA images that depict one or more solid objects (e.g., foreground elements) against a transparent background (here, represented by a gray background). First alpha mattes 410 and second alpha mattes 420 are grayscale representations of alpha channels of first alpha images 405 and second alpha images 415, respectively, where black indicates a transparent area, white indicates an opaque area, and grayscale values between black and white indicate corresponding semi-transparent areas.

Figure 5:
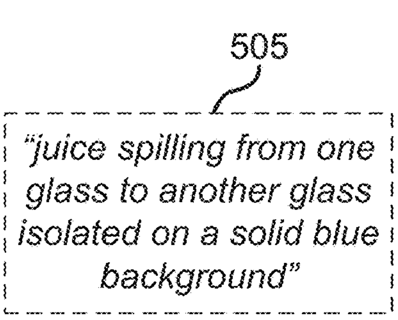
FIG. 5 shows an example of generated images according to aspects of the present disclosure.
Figure 5:
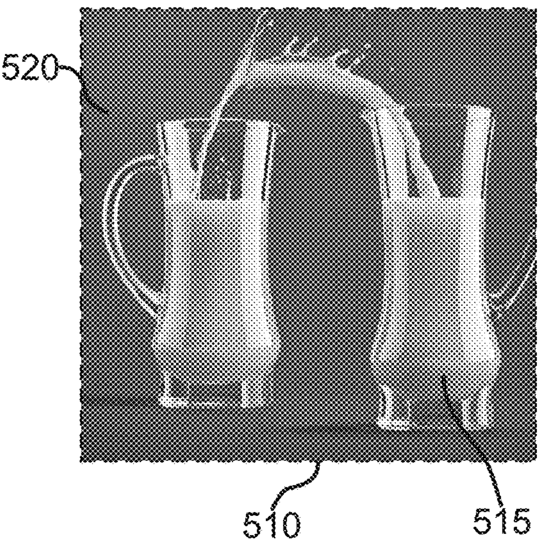
Figure 5:
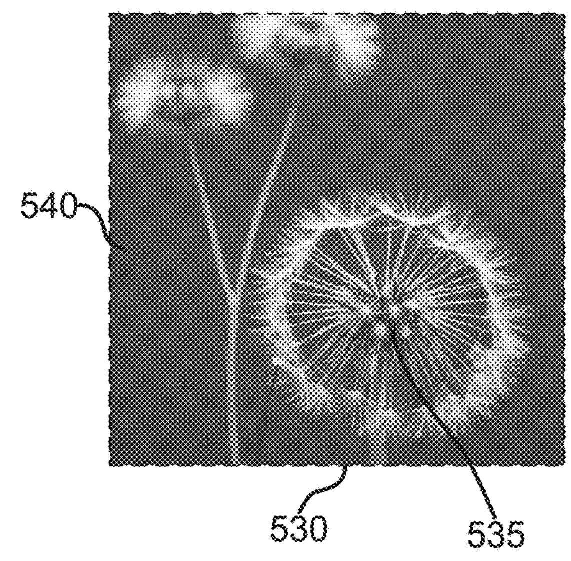
Figure 5:
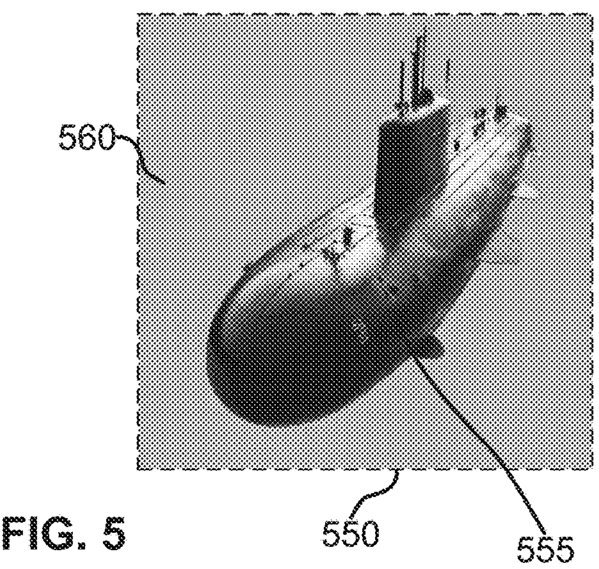

FIG. 5 shows an example 500 of generated images according to aspects of the present disclosure. The example shown includes first text prompt 505, first image 510, second text prompt 525, second image 530, third text prompt 545, and third image 550. In one aspect, first image 510 includes first object 515 and first keyable background 520. In one aspect, second image 530 includes second object 535 and second keyable background 540. In one aspect, third image 550 includes third object 555 and third keyable background 560.

Referring to FIG. 5, first image 510, second image 530, and third image 550 are examples of images depicting an object (e.g., first object 515, second object 535, and third object 555, respectively) against a keyable background (e.g., first keyable background 520, second keyable background 540, and third keyable background 560, respectively) generated using an image generation model as described with reference to FIGS. 11-17. As shown in FIG. 5, first image 510 is described by first text prompt 505 and depicts juice spilling from one glass to another glass (e.g., first object 515) isolated on a solid blue background (e.g., first keyable background 520), second image 530 is described by second text prompt 525 and depicts dandelions (e.g., second object 535) against a solid blue background (e.g., second keyable background 540), and third image 550 is described by third text prompt 545 and depicts a submarine (e.g., third object 555) isolated on a solid green background (e.g., third keyable background 560).

Figure 6:
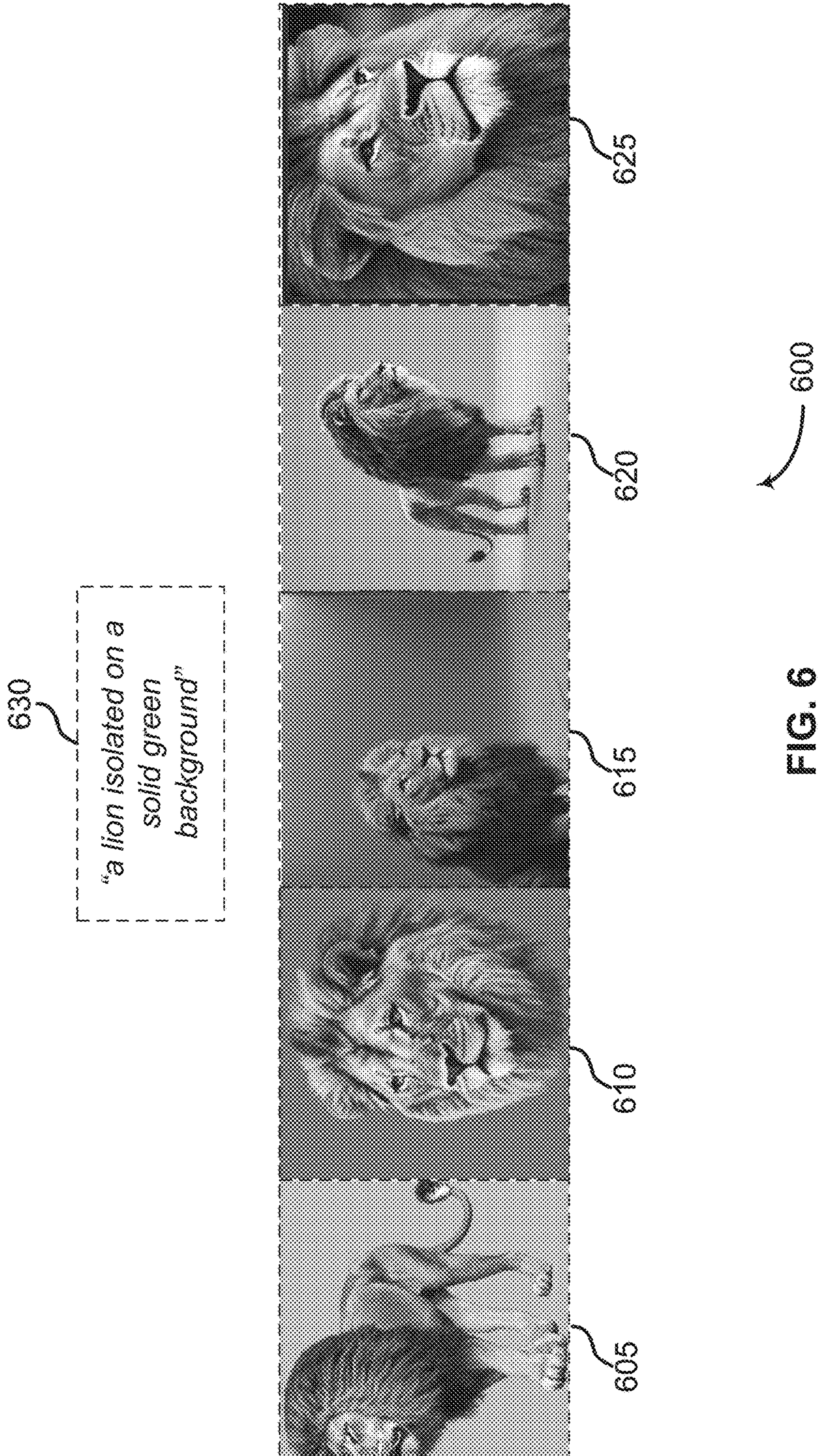
FIG. 6 shows an example of comparative generated images.

FIG. 6 shows an example 600 of comparative generated images. The example shown includes first comparative image 605, second comparative image 610, third comparative image 615, fourth comparative image 620, fifth comparative image 625, and comparative text prompt 630.

Referring to FIG. 6, first comparative image 605, second comparative image 610, third comparative image 615, fourth comparative image 620, and fifth comparative image 625 are examples of images generated by conventional image generation models according to comparative text prompt 630, "a lion isolated on a solid green background". However, in contrast to the images shown in FIG. 5, each of the comparative images are not keyable, either because they depict a foreground element lacking fine detail, a foreground element that is tinted green (and is therefore not separable from a green background using color keying methods), or include a background that is not suitable for keying (for example, by including multiple shades of green or not including a monochrome green background, contrary to comparative text prompt 630). In other words, none of first comparative image 605, second comparative image 610, third comparative image 615, fourth comparative image 620, and fifth comparative image 625 manage to depict a lion that is sufficiently isolated from a background.

Figure 7:
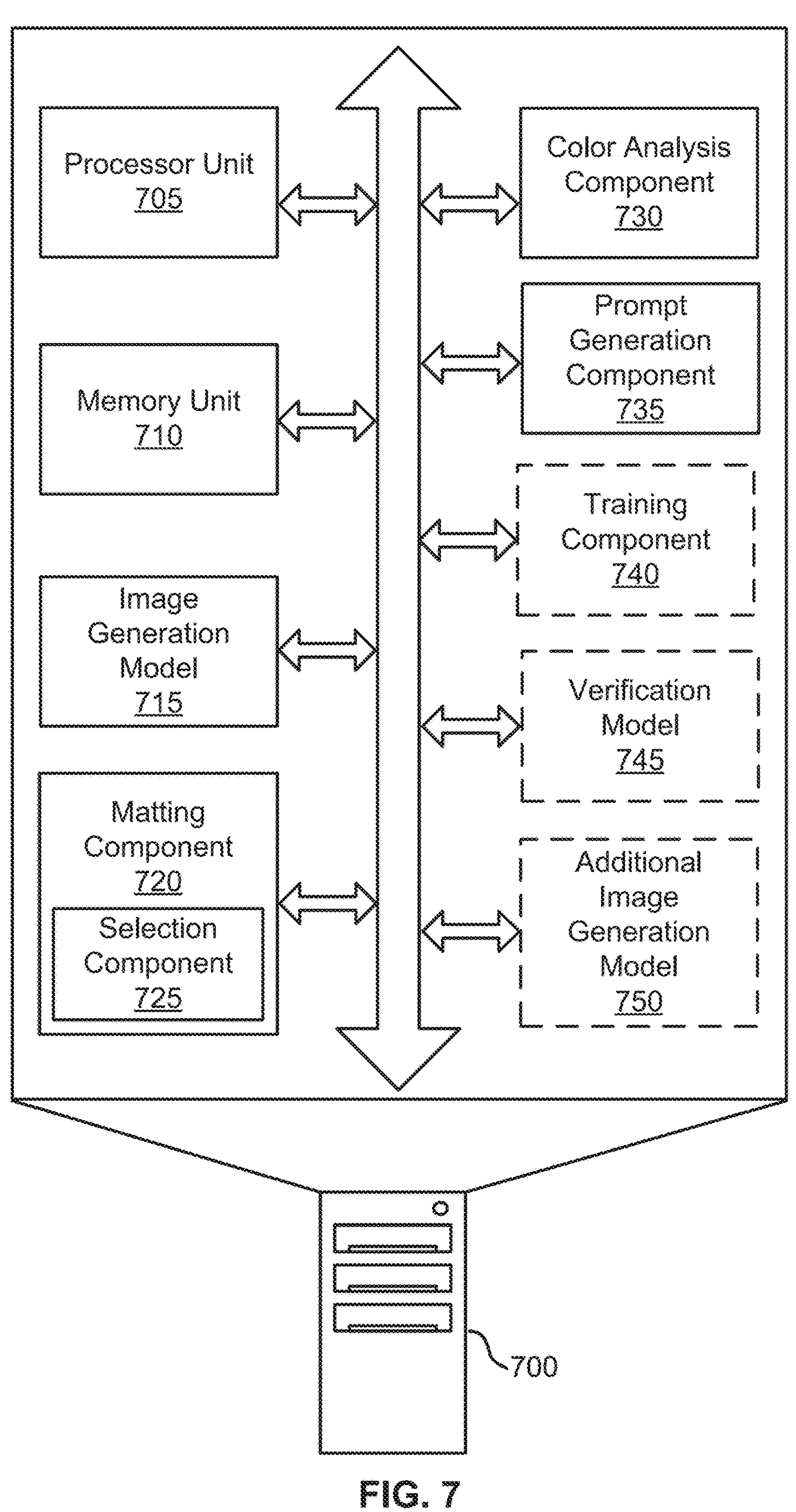
FIG. 7 shows an example of an image generation apparatus according to aspects of the present disclosure.

FIG. 7 shows an example of an image generation apparatus 700 according to aspects of the present disclosure. Image generation apparatus 700 is an example of, or includes aspects of, the corresponding element described with reference to FIGS. 1, 8, and 21. In one aspect, image generation apparatus 700 includes processor unit 705, memory unit 710, image generation model 715, matting component 720, color analysis component 730, prompt generation component 735, training component 740, verification model 745, and additional image generation model 750.

Processor unit 705 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 705 is configured to operate a memory array using a memory controller. In other cases, a memory controller is integrated into processor unit 705. In some cases, processor unit 705 is configured to execute computer-readable instructions stored in memory unit 710 to perform various functions. In some aspects, processor unit 705 includes special purpose components for modem processing, baseband processing, digital signal processing, or transmission processing. According to some aspects, processor unit 705 comprises the one or more processors described with reference to FIG. 21.

Memory unit 710 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 705 to perform various functions described herein.

In some cases, memory unit 710 includes a basic input/output system (BIOS) that controls basic hardware or software operations, such as an interaction with peripheral components or devices. In some cases, memory unit 710 includes a memory controller that operates memory cells of memory unit 710. For example, the memory controller may include a row decoder, column decoder, or both. In some cases, memory cells within memory unit 710 store information in the form of a logical state. According to some aspects, memory unit 710 comprises the memory subsystem described with reference to FIG. 21.

Image generation model 715 is an example of, or includes aspects of, the corresponding element described with reference to FIG. 8. According to some aspects, image generation model 715 is implemented as software stored in memory unit 710 and executable by processor unit 705, as firmware, as one or more hardware circuits, or as a combination thereof. According to some aspects, image generation model 715 comprises image generation parameters (e.g., machine learning parameters) stored in memory unit 710.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data. Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, that control a degree of connections between neurons and influence the neural network's ability to capture complex patterns in data. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 715 comprises one or more ANNs trained to generate an image including an object and a keyable background based on a text prompt describing the object and the keyable background. For example, in some cases, image generation model 715 comprises a diffusion model. According to some aspects, the diffusion model implements a reverse diffusion process (such as the reverse diffusion process described with reference to FIGS. 9 and 14). In some cases, image generation model 715 includes a U-Net (such as a U-Net described with reference to FIG. 10). In some aspects, the image generation model 715 is trained using a training image including a training keyable background.

According to some aspects, image generation model 715 obtains a text prompt describing the object and the keyable background. In some examples, image generation model 715 generates an image including the object and the keyable background based on the text prompt. In some aspects, the keyable background is a monochrome color.

In some examples, image generation model 715 generates a preliminary image based on a preliminary text prompt describing the object and a preliminary background. In some aspects, the preliminary background includes a neutral monochrome color.

Matting component 720 is an example of, or includes aspects of, the corresponding element described with reference to FIG. 8. According to some aspects, matting component 720 is implemented as software stored in memory unit 710 and executable by processor unit 705, as firmware, as one or more hardware circuits, or as a combination thereof. According to some aspects, matting component 720 comprises matting parameters (e.g., machine learning parameters) stored in memory unit 710.

According to some aspects, matting component 720 generates an alpha image by replacing the keyable background with an alpha channel. In some aspects, generating the alpha image includes performing a matting algorithm. In some aspects, generating the alpha image includes performing a set of matting algorithms. In some cases, the set of matting algorithms includes one or more of a pixel-based chroma key algorithm, a deep-learning based chromakey model, and an object selection algorithm. According to some aspects, the deep-learning based chromakey model is trained based on a dataset including an RGB image and a background RGB image to replace the keyable background with the alpha channel. In some aspects, the matting component 720 includes a selection component 725 configured to select an output from one of a set of matting algorithms as the alpha image.

In one aspect, matting component 720 includes selection component 725. According to some aspects, selection component 725 is implemented as software stored in memory unit 710 and executable by processor unit 705, as firmware, as one or more hardware circuits, or as a combination thereof. According to some aspects, selection component 725 selects an output from one of the set of matting algorithms as the alpha image.

Color analysis component 730 is an example of, or includes aspects of, the corresponding element described with reference to FIG. 8. According to some aspects, color analysis component 730 is implemented as software stored in memory unit 710 and executable by processor unit 705, as firmware, as one or more hardware circuits, or as a combination thereof. According to some aspects, color analysis component 730 is configured to determine the keyable background based on a color analysis of a preliminary image depicting the object.

Prompt generation component 735 is an example of, or includes aspects of, the corresponding element described with reference to FIG. 8. According to some aspects, prompt generation component 735 is implemented as software stored in memory unit 710 and executable by processor unit 705, as firmware, as one or more hardware circuits, or as a combination thereof.

According to some aspects, prompt generation component 735 obtains a preliminary text prompt describing the object and a preliminary background. In some examples, prompt generation component 735 modifies the preliminary text prompt with a description of the keyable background to obtain the text prompt.

According to some aspects, prompt generation component 735 obtains a text description of the object. In some examples, prompt generation component 735 generates the training prompt based on the text description and a description of the keyable background.

According to some aspects, prompt generation component 735 includes prompt generation parameters (e.g., machine learning parameters) stored in memory unit 710. In some cases, prompt generation component 735 comprises one or more ANNs configured to modify the preliminary text prompt or a text description of the object with the description of the keyable background to obtain the text prompt or the training prompt. For example, in some cases, prompt generation component 735 comprises a language model. In some cases, prompt generation component 735 comprises a large language model.

A language model is a machine learning model that is designed and/or trained to learn statistical patterns and structures of human language. Language models are capable of a wide range of language-related tasks such as text completion, question answering, translation, summarization, and creative writing, in response to a prompt. A large language model refers to a language model trained on a large dataset.

In some cases, the language model comprises one or more transformers. In some cases, a transformer comprises one or more ANNs (such as a U-Net) comprising attention mechanisms that enable the transformer to weigh an importance of different words or tokens within a sequence. In some cases, a transformer processes entire sequences simultaneously in parallel, making the transformer highly efficient and allowing the transformer to capture long-range dependencies more effectively.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. In some cases, the self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, that allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models (such as recurrent neural networks) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains its current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are typically vectors or matrices that are used to represent the input data. The key K is used to determine which parts of the input the attention mechanism should focus on, while the value V is used to represent the actual data being processed.

According to some aspects, training component 740 is implemented as software stored in memory unit 710 and executable by processor unit 705, as firmware, as one or more hardware circuits, or as a combination thereof. According to some aspects, training component 740 is omitted from image generation apparatus 700. According to some aspects, training component 740 is implemented as software stored in memory and executable by a processor of an external apparatus, as firmware of the external apparatus, as one or more hardware circuits of the external apparatus, or as a combination thereof, and communicates with image generation apparatus 700 to perform the functions described herein.

According to some aspects, training component 740 creates a training dataset including a training image and a training prompt, where the training image depicts an object and a keyable background. According to some aspects, training component 740 is configured to train image generation model 715 using a training image including a training keyable background. In some examples, training component 740 trains image generation model 715 to generate images with keyable backgrounds based on the training image and the training prompt.

In some examples, training component 740 creates an additional training dataset using the trained image generation model, where the additional training dataset includes an alpha image having an alpha channel. In some aspects, creating the additional training dataset includes performing a matting algorithm to replace the keyable background with the alpha channel.

In some examples, training component 740 trains verification model 745 to label alpha images using the additional training dataset. In some examples, training component 740 trains additional image generation model 750 based on the additional training dataset.

According to some aspects, verification component 745 is implemented as software stored in memory unit 710 and executable by processor unit 705, as firmware, as one or more hardware circuits, or as a combination thereof. According to some aspects, verification component 745 is omitted from image generation apparatus 700. According to some aspects, verification component 745 is implemented as software stored in memory and executable by a processor of an external apparatus, as firmware of the external apparatus, as one or more hardware circuits of the external apparatus, or as a combination thereof, and communicates with image generation apparatus 700 to perform the functions described herein.

According to some aspects, verification component 745 comprises verification parameters (e.g., machine learning parameters) stored in memory unit 710 or the memory of the external apparatus. In some cases, verification component 745 comprises one or more ANNs trained to label alpha images using the additional training dataset. For example, in some cases, verification component 745 comprises a classifier.

In some aspects, a classifier is a machine learning model that assigns input data to predefined categories or classes. In some cases, the classifier learns patterns and relationships from labeled training data and uses this knowledge to classify new, unseen data. Common classifier architectures include decision trees, support vector machines (SVMs), k-nearest neighbors (KNN), logistic regression, naive Bayes, and deep learning models such as convolutional neural networks (CNNs), recurrent neural networks (RNNs), transformers, and others.

A CNN is a class of ANN that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). In some cases, an RNN includes one or more finite impulse recurrent networks (characterized by nodes forming a directed acyclic graph), one or more infinite impulse recurrent networks (characterized by nodes forming a directed cyclic graph), or a combination thereof.

According to some aspects, additional image generation model 750 is implemented as software stored in memory unit 710 and executable by processor unit 705, as firmware, as one or more hardware circuits, or as a combination thereof. According to some aspects, additional image generation model 750 is omitted from image generation apparatus 700. According to some aspects, additional image generation model 750 is implemented as software stored in memory and executable by a processor of an external apparatus, as firmware of the external apparatus, as one or more hardware circuits of the external apparatus, or as a combination thereof, and communicates with image generation apparatus 700 to perform the functions described herein.

According to some aspects, additional image generation model 750 comprises additional image generation parameters (e.g., machine learning parameters) stored in memory unit 710 or the memory of the external apparatus. In some cases, additional image generation model 750 comprises one or more ANNs trained to generate an additional image based on the additional training dataset. For example, in some cases, additional image generation model 750 comprises an additional diffusion model. According to some aspects, the additional diffusion model implements a reverse diffusion process (such as the reverse diffusion process described with reference to FIGS. 9 and 14). In some cases, additional image generation model 750 includes a U-Net (such as a U-Net described with reference to FIG. 10).

Figure 8:
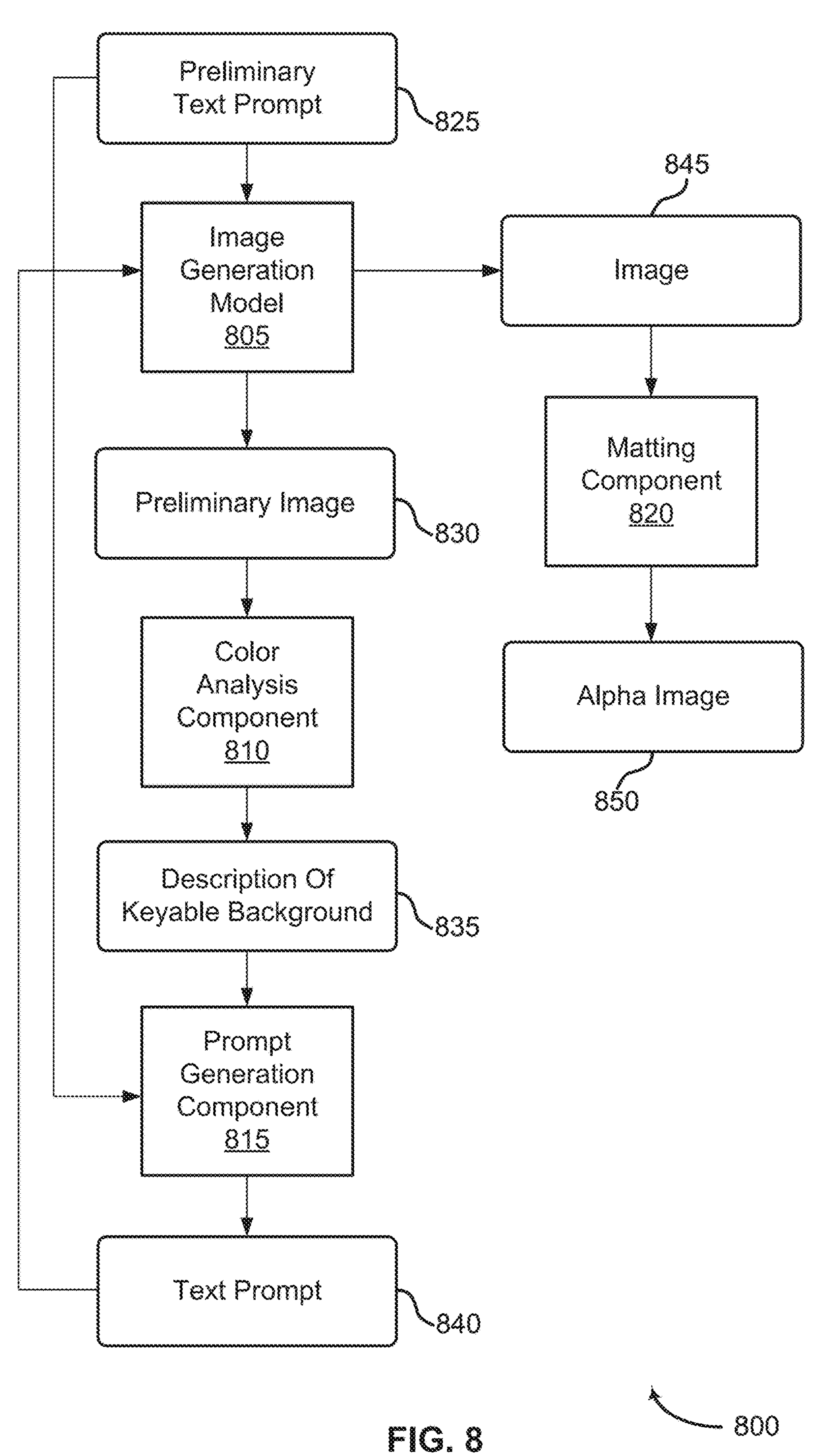
FIG. 8 shows an example of data flow in an image generation apparatus according to aspects of the present disclosure.

FIG. 8 shows an example of data flow in an image generation apparatus 800 according to aspects of the present disclosure. The example shown includes image generation apparatus 800, preliminary text prompt 825, preliminary image 830, description of keyable background 835, text prompt 840, image 845, and alpha image 850. Preliminary text prompt 825 is an example of, or includes aspects of, the corresponding element described with reference to FIG. 13. Preliminary image 830 is an example of, or includes aspects of, the corresponding element described with reference to FIGS. 12 and 13. Image 845 is an example of, or includes aspects of, the corresponding elements described with reference to FIGS. 5, 9, and 14-17. Alpha image 850 is an example of, or includes aspects of, the corresponding elements described with reference to FIGS. 3 and 4.

Image generation apparatus 800 is an example of, or includes aspects of, the corresponding element described with reference to FIGS. 1 and 7. In one aspect, image generation apparatus 800 includes image generation model 805, color analysis component 810, prompt generation component 815, and matting component 820. Image generation model 805 is an example of, or includes aspects of, the corresponding element described with reference to FIG. 7. Color analysis component 810 is an example of, or includes aspects of, the corresponding element described with reference to FIG. 7. Prompt generation component 815 is an example of, or includes aspects of, the corresponding element described with reference to FIG. 7. Matting component 820 is an example of, or includes aspects of, the corresponding element described with reference to FIG. 7.

Referring to FIG. 8, according to some aspects, image generation model 805 obtains preliminary text prompt 825. In some cases, preliminary text prompt 825 is retrieved from a database (such as the database described with reference to FIG. 1). In some cases, preliminary text prompt 825 is provided by a user. In some cases, preliminary text prompt 825 is generated by prompt generation component 815.

According to some aspects, image generation model 805 generates preliminary image 830 based on preliminary text prompt 825. According to some aspects, color analysis component 810 obtains description of keyable background 835 based on a least common hue or color included in preliminary image 830. According to some aspects, prompt generation component 815 generates text prompt 840 based on preliminary text prompt 825 and description of keyable background 835. In some cases, prompt generation component 815 generates text prompt 840 based on a text description of an image and description of keyable background 835.

According to some aspects, image generation model 805 generates image 845 including an object isolated against the keyable background based on text prompt 840. According to some aspects, matting component 820 generates alpha image 850 by replacing the keyable background in image 845 with an alpha channel.

Figure 9:
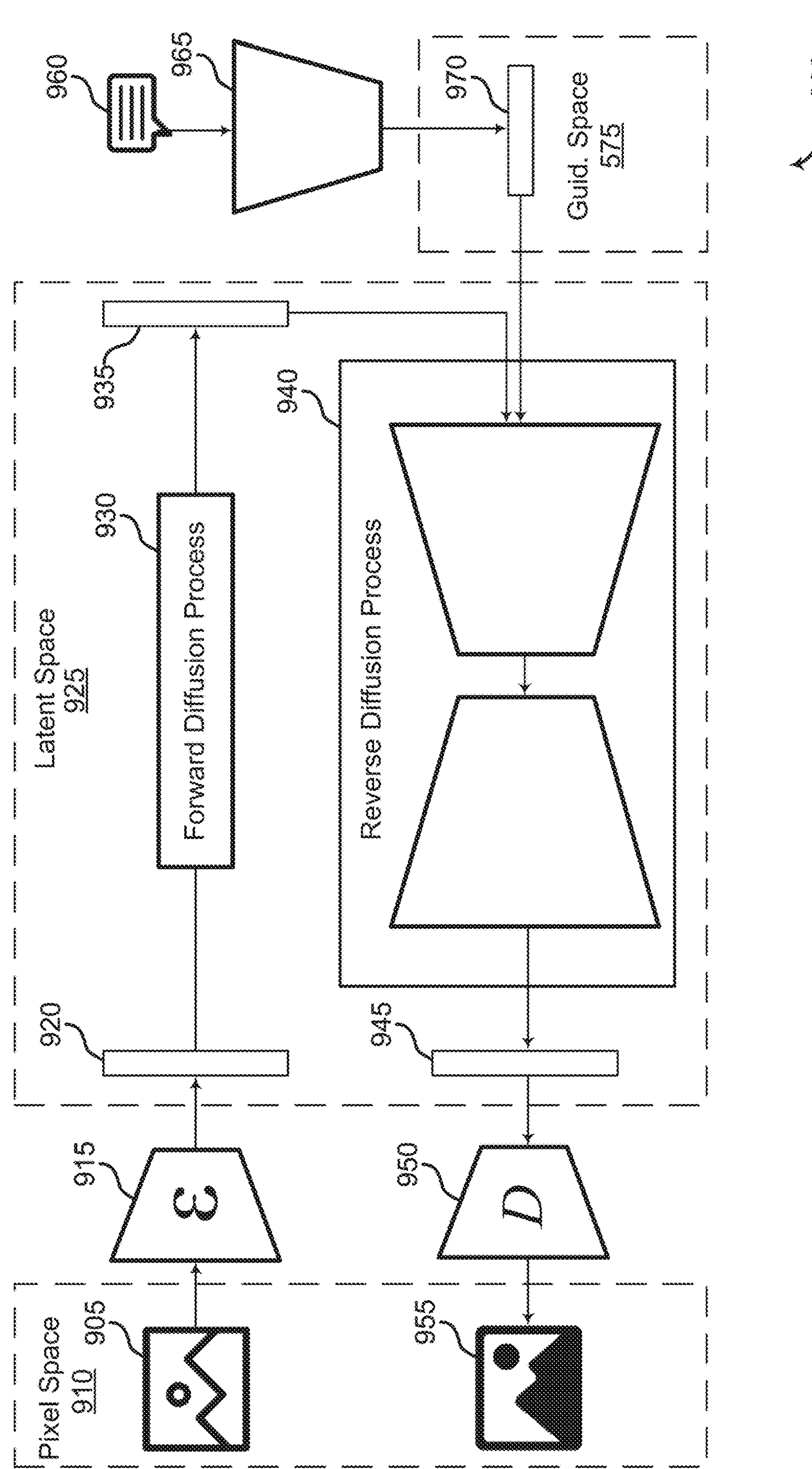
FIG. 9 shows an example of a guided diffusion architecture according to aspects of the present disclosure.

FIG. 9 shows an example of a guided diffusion architecture according to aspects of the present disclosure. Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 915 encodes original image 905 from pixel space 910 and generates original image features 920 in latent space 925. In some cases, original image 905 is an example of, or includes aspects of, a training image described with reference to FIG. 19. In some cases, image encoder 915 covers an image structure and semantic concepts of original image 905.

According to some aspects, forward diffusion process 930 gradually adds noise to original image features 920 to obtain noisy features 935 (also in latent space 925) at various noise levels. In some cases, forward diffusion process 930 is implemented as the forward diffusion process described with reference to FIG. 14 or 19. In some cases, forward diffusion process 930 is implemented by an image generation apparatus (such as the image generation apparatus described with reference to FIGS. 1, 7-8, and 21) or by a training component (such as the training component described with reference to FIG. 7).

According to some aspects, reverse diffusion process 940 is applied to noisy features 935 to gradually remove the noise from noisy features 935 at the various noise levels to obtain denoised image features 945 in latent space 925. In some cases, reverse diffusion process 940 is implemented as the reverse diffusion process described with reference to FIG. 14 or 19. In some cases, reverse diffusion process 940 is implemented by the image generation model described with reference to FIGS. 7-8 or the additional image generation model described with reference to FIG. 7. In some cases, reverse diffusion process 940 is implemented by a U-Net ANN described with reference to FIG. 10 included in the image generation model or the additional image generation model.

According to some aspects, a training component (such as the training component described with reference to FIG. 7) compares denoised image features 945 to original image features 920 at each of the various noise levels, and updates parameters of the image generation model or the additional image generation model based on the comparison. In some cases, image decoder 950 decodes denoised image features 945 to obtain output image 955 in pixel space 910. In some cases, an output image 955 is created at each of the various noise levels. In some cases, the training component compares output image 955 to original image 905 to train the diffusion model.

In some cases, image encoder 915 and image decoder 950 are pretrained prior to training the image generation model. In some examples, image encoder 915, image decoder 950, and the image generation model are jointly trained. In some cases, image encoder 915 and image decoder 950 are jointly fine-tuned with the image generation model.

According to some aspects, reverse diffusion process 940 is guided based on a guidance prompt such as one or more prompts 960 (e.g., a preliminary text prompt, a text prompt, an additional text prompt, an alpha matte, or a combination thereof). In some cases, prompt 960 is encoded using encoder 965 to obtain guidance features 970 in guidance space 975. In some cases, guidance features 970 are combined with noisy features 935 at one or more layers of reverse diffusion process 940 to encourage output image 955 to include content described by prompt 960. For example, guidance features 970 can be combined with noisy features 935 using a cross-attention block within reverse diffusion process 940.

Cross-attention, also known as multi-head attention, is an extension of the attention mechanism used in some ANNs for NLP tasks. In some cases, cross-attention enables reverse diffusion process 940 to attend to multiple parts of an input sequence simultaneously, capturing interactions and dependencies between different elements. In cross-attention, there are typically two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing reverse diffusion process 940 to better understand the context and generate more accurate and contextually relevant outputs.

According to some aspects, image encoder 915 and image decoder 950 are omitted, and forward diffusion process 930 and reverse diffusion process 940 occur in pixel space 910. For example, in some cases, forward diffusion process 930 adds noise to original image 905 to obtain noisy images in pixel space 910, and reverse diffusion process 940 gradually removes noise from the noisy images to obtain output image 955 in pixel space 910.

Figure 10:
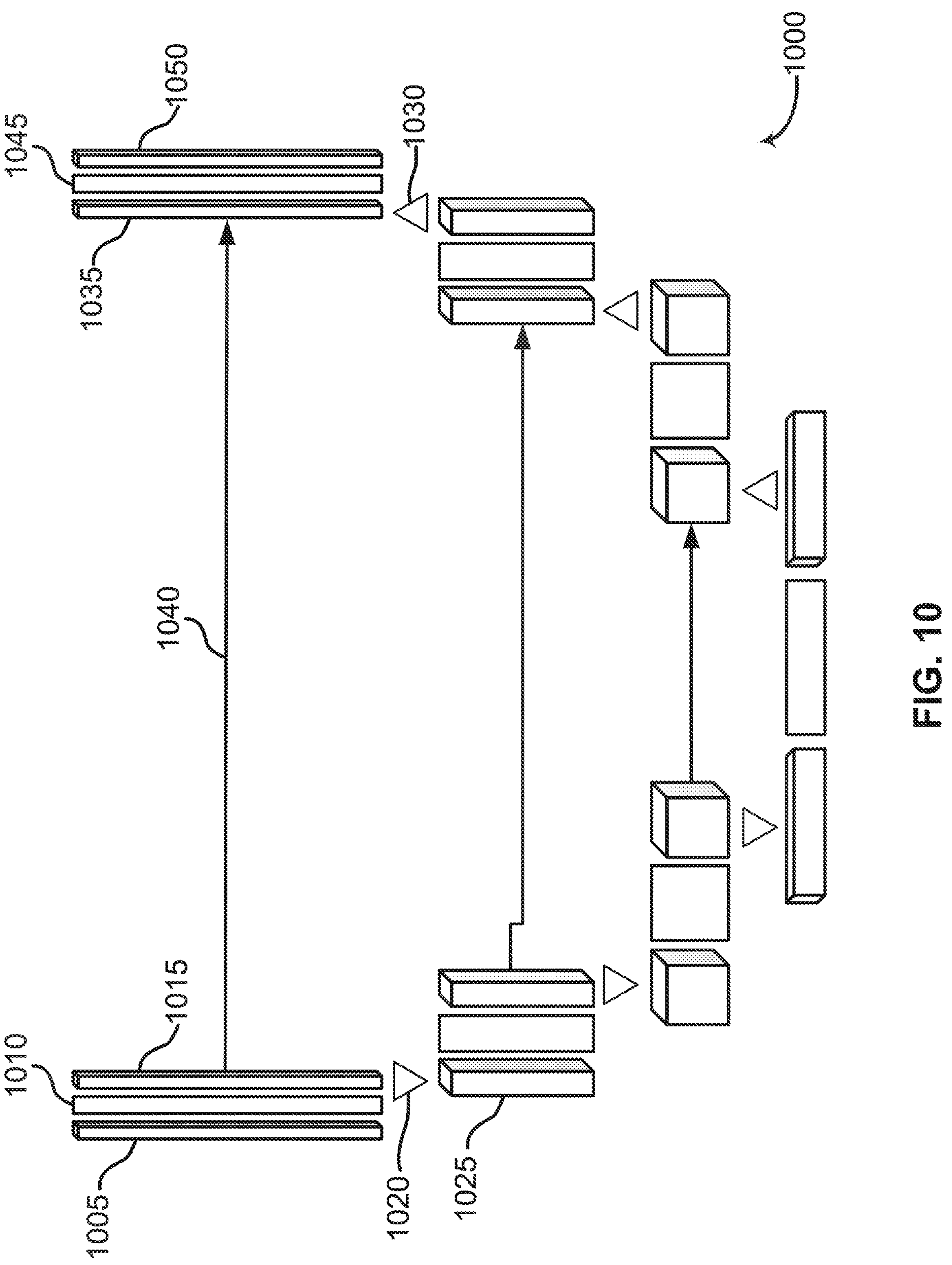
FIG. 10 shows an example of a U-Net according to aspects of the present disclosure.

FIG. 10 shows an example of a U-Net 1000 according to aspects of the present disclosure. According to some aspects, one or more of an image generation model described with reference to FIGS. 7-8, an additional image generation model described with reference to FIG. 7, and a prompt generation component described with reference to FIGS. 7-8 comprises an ANN architecture known as a U-Net. In some cases, U-Net 1000 implements the reverse diffusion process described with reference to FIG. 9, 14, or 19.

According to some aspects, U-Net 1000 receives input features 1005, where input features 1005 include an initial resolution and an initial number of channels, and processes input features 1005 using an initial neural network layer 1010 (e.g., a convolutional neural network layer) to produce intermediate features 1015.

In some cases, intermediate features 1015 are then down-sampled using a down-sampling layer 1020 such that down-sampled features 1025 have a resolution less than the initial resolution and a number of channels greater than the initial number of channels.

In some cases, this process is repeated multiple times, and then the process is reversed. For example, down-sampled features 1025 are up-sampled using up-sampling process 1030 to obtain up-sampled features 1035. In some cases, up-sampled features 1035 are combined with intermediate features 1015 having a same resolution and number of channels via skip connection 1040. In some cases, the combination of intermediate features 1015 and up-sampled features 1035 are processed using final neural network layer 1045 to produce output features 1050. In some cases, output features 1050 have the same resolution as the initial resolution and the same number of channels as the initial number of channels.

According to some aspects, U-Net 1000 receives additional input features to produce a conditionally generated output. In some cases, the additional input features include a vector representation of an input prompt. In some cases, the additional input features are combined with intermediate features 1015 within U-Net 1000 at one or more layers. For example, in some cases, a cross-attention module is used to combine the additional input features and intermediate features 1015.

Image Generation

A method for image generation is described with reference to FIGS. 11-17. One or more aspects of the method include obtaining a text prompt describing an object and a keyable background; generating an image including the object and the keyable background based on the text prompt; and generating an alpha image by replacing the keyable background with an alpha channel. In some aspects, the keyable background is a monochrome color. Some examples of the method further include determining the keyable background based on a color analysis of a preliminary image depicting the object. In some aspects, the image generation model is trained using a training image including a training keyable background.

Some examples of the method further include generating the preliminary image based on a preliminary text prompt describing the object and a preliminary background. In some aspects, the preliminary background comprises a neutral monochrome color.

Some examples of the method further include obtaining a preliminary text prompt describing the object and a preliminary background. Some examples further include modifying the preliminary text prompt with a description of the keyable background to obtain the text prompt.

In some aspects, generating the alpha image comprises performing a matting algorithm. In some aspects, generating the alpha image comprises performing a plurality of matting algorithms and selecting an output from one of the plurality of matting algorithms as the alpha image.

Figure 11:
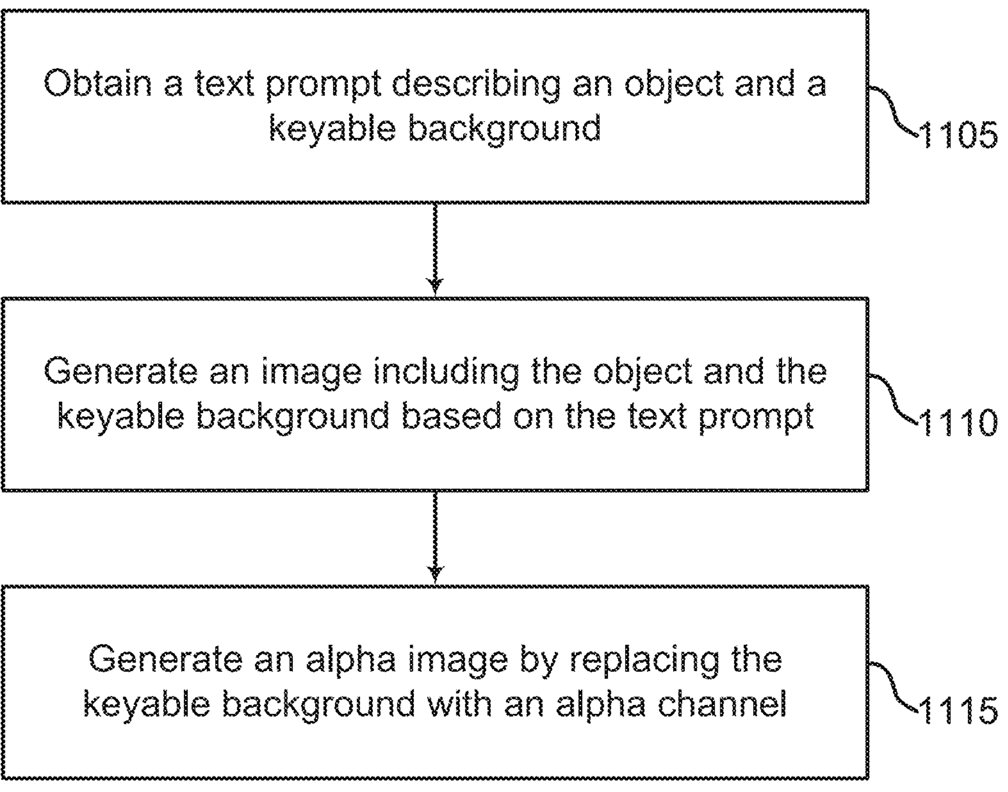
FIG. 11 shows an example of a method for generating an alpha image according to aspects of the present disclosure.

FIG. 11 shows an example of a method 1100 for generating an alpha image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, aspects of the present disclosure provide an image generation apparatus (such as the image generation apparatus described with reference to FIGS. 1, 7-8, and 21) that uses an image generation model (such as the image generation model described with reference to FIGS. 7-8) to generate an image depicting an object (e.g., a foreground element) isolated against a keyable background. In some cases, the image generation model generates the image based on a text prompt, where the text prompt describes the object and the keyable background. According to some aspects, a matting component of the image generation apparatus (such as the matting component described with reference to FIGS. 7-8) generates an alpha image by replacing the keyable background with an alpha channel.

In some cases, by generating the image using the image generation model, aspects of the present disclosure provide a keyable image in a more efficient manner than conventional techniques for generating keyable images. Furthermore, in some cases, by generating the alpha image based on a text prompt describing the image, the image generation apparatus allows any user, including a non-expert user, to more quickly and efficiently generate a user-specified object isolated against a transparent background than conventional techniques for generating alpha images.

At operation 1105, the system obtains a text prompt describing an object and a keyable background. In some cases, the operations of this step refer to, or may be performed by, an image generation model as described with reference to FIGS. 7 and 8.

In some cases, the keyable background is a monochrome color. In some cases, a color analysis component (such as the color analysis component described with reference to FIGS. 7-8) determines the keyable background based on a color analysis of a preliminary image depicting the object. For example, in some cases, the keyable background comprises a least common hue included in the preliminary image. In some cases, the keyable background consists of the least common hue included in the preliminary image. A color analysis of a preliminary image is described with reference to FIGS. 12 and 13.

In some cases, a prompt generation component (such as the prompt generation component described with reference to FIGS. 7-8) generates the text prompt based on the color analysis. For example, in some cases, the prompt generation component modifies a preliminary text prompt or a text description of the object to include a description of a hue determined by the color analysis component to be a least common hue in the preliminary image. An example of a modification of a text description of an object or of a preliminary text prompt to obtain the text prompt is described with reference to FIGS. 12 and 13. In some cases, the image generation model retrieves the text prompt from a database (such as the database described with reference to FIG. 1), from another data source (such as the Internet), or from a user.

In some cases, the image generation model generates the preliminary image based on the preliminary text prompt, where the preliminary text prompt describes the object and a preliminary background. In some cases, the preliminary background comprises a neutral monochrome color (such as gray). In some cases, the preliminary background consists of the neutral monochrome color (such as gray). An example of a preliminary image is described with reference to FIG. 12.

In some cases, the prompt generation component generates the preliminary text prompt based on a text description of the object. For example, in some cases, the prompt generation component modifies the text description to include a description of the preliminary background. In some cases, the prompt generation component retrieves the text description from a database (such as the database described with reference to FIG. 1), from another data source (such as the Internet), or from a user. In some cases, the image generation component retrieves the preliminary text prompt from a database (such as the database described with reference to FIG. 1), from another data source (such as the Internet), or from a user. Examples of a text description of an object and of a preliminary text prompt are described with reference to FIG. 12.

At operation 1110, the system generates an image including the object and the keyable background based on the text prompt. In some cases, the operations of this step refer to, or may be performed by, an image generation model as described with reference to FIGS. 7 and 8. For example, in some cases, the image generation model generates the image using a reverse diffusion process as described with reference to FIG. 14. In some cases, the image generation model is trained using a training image including a training keyable background as described with reference to FIGS. 18-20.

At operation 1115, the system generates an alpha image by replacing the keyable background with an alpha channel. In some cases, the operations of this step refer to, or may be performed by, a matting component as described with reference to FIGS. 7 and 8. In some cases, the alpha channel indicates that the area of the alpha image corresponding to the keyable background is transparent. In some cases, the alpha channel indicates that the area of the alpha image corresponding to the object is opaque or semi-opaque. In some cases, generating the alpha image includes performing a matting algorithm. In some cases, the output of the matting algorithm is the alpha image. In some cases, generating the alpha image includes performing a set of matting algorithms and selecting an output from one of the set of matting algorithms as the alpha image. An example of performing a set of matting algorithms and selecting an output from one of the set of matting algorithms as the alpha image is described with reference to FIGS. 15-17.

Figure 12:
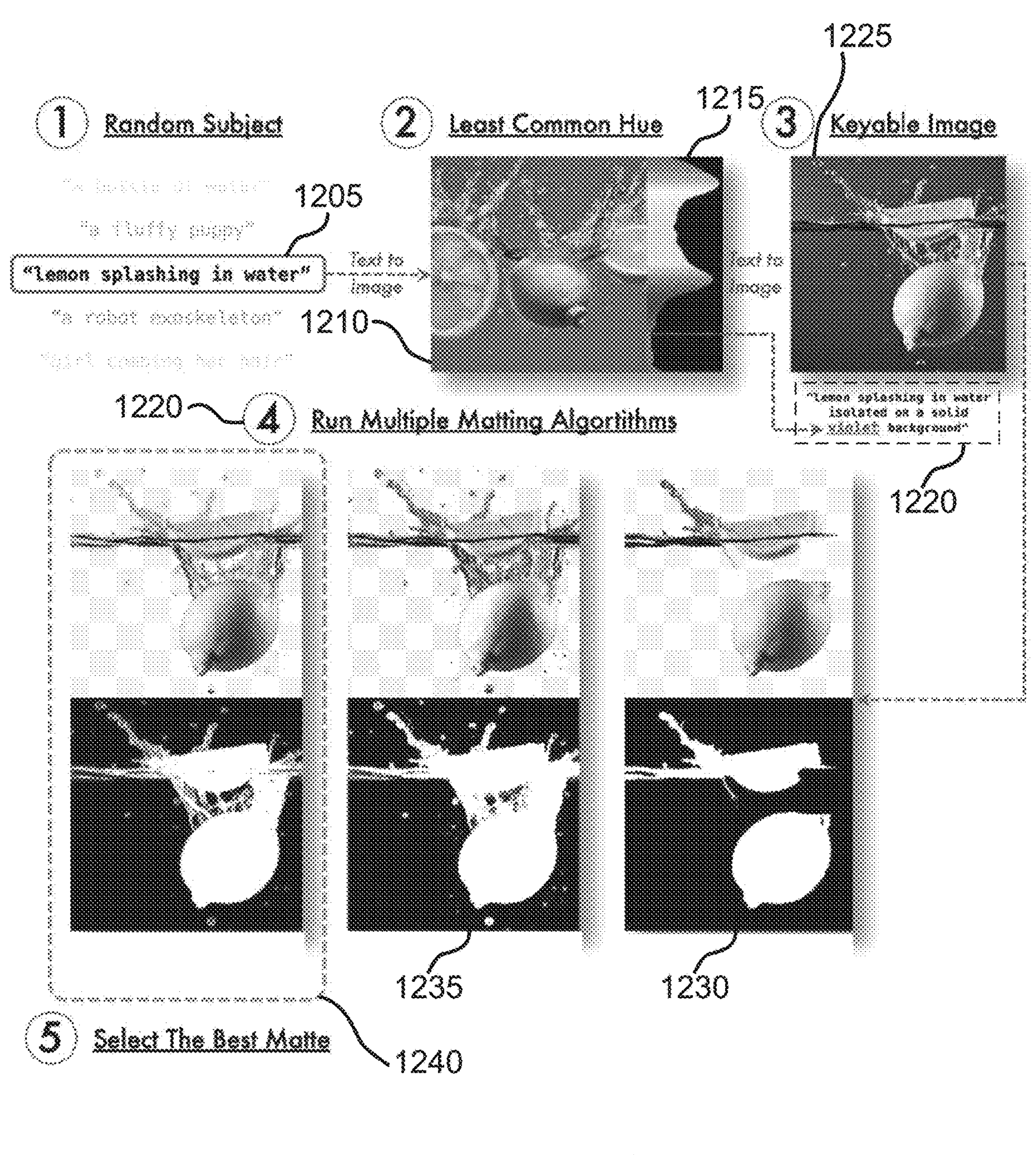
FIG. 12 shows an example of an alpha image generation process according to aspects of the present disclosure.

FIG. 12 shows an example 1200 of an alpha image generation process according to aspects of the present disclosure. The example shown includes text description 1205, preliminary image 1210, color histogram 1215, text prompt 1220, image 1225, first candidate alpha image 1230 (shown together with an alpha matte), second candidate alpha image 1235 (shown together with an alpha matte), and alpha image 1240 (shown together with an alpha matte). Preliminary image 1210 is an example of, or includes aspects of, the corresponding elements described with reference to FIGS. 8 and 13. Color histogram 1215 is an example of, or includes aspects of, the corresponding element described with reference to FIG. 13. Text prompt 1220 is an example of, or includes aspects of, the corresponding element described with reference to FIGS. 5 and 8-9. Image 1225 is an example of, or includes aspects of, the corresponding element described with reference to FIGS. 5, 8-9, and 14-17. First candidate alpha image 1230 and second candidate alpha image 1235 are examples of, or include aspects of, candidate alpha images described with reference to FIGS. 15-17. Alpha image 1240 is an example of, or includes aspects of, the corresponding element described with reference to FIGS. 3-4 and 15-17.

Referring to FIG. 12, according to some aspects, an image generation apparatus (such as the image generation apparatus described with reference to FIGS. 7-8) generates an alpha image depicting an object isolated on a keyable background (such as a background comprising or consisting of a monochrome color) so that the object is capable of being easily isolated and extracted from the alpha image.

According to some aspects, a first step in generating an alpha image is identifying a text description (such as text description 1205) of the object. In some cases, the text description omits a description of another object or a background.

According to some aspects, a prompt generation component (such as the prompt generation component described with reference to FIGS. 7-8) generates the text description using a language model or a procedural generation algorithm. In some cases, a user prompts the prompt generation component to generate the text description. In some cases, the prompt generation component generates the text description based on a list of objects provided to the prompt generation component including one or more of general objects and objects including details that correspond to complex mattes, such as hair, fur, or transparent parts. In some cases, the prompt generation component extrapolates an object category for additional variety.

In some cases, the procedural generation algorithm includes a template mechanism for procedurally constructing a description of an object depicting a human. In some cases, the procedural generation algorithm focuses on diversity by attempting to capture many different professions, ethnicities, clothing, accessories, genders, hairstyles, etc. Example text descriptions generated using the procedural generation algorithm include "lawyer woman diamond earrings", "person wearing gown", and "Hispanic barista man with black flowing hair".

According to some aspects, the prompt generation component or the image generation model retrieves the text description from a database (such as the database described with reference to FIG. 1), from another data source (such as the Internet), or from a user. According to some aspects, the prompt generation component searches a dataset of candidate text descriptions for identifying words such as "clipping path", "greenscreen", "on a white background", etc. In some cases, the prompt generation component obtains the text description by removing the identifying words from the candidate text description.

According to some aspects, the prompt generation component generates a preliminary text prompt (such as the preliminary text prompt described with reference to FIG. 8) based on the text description. For example, in some cases, the prompt generation component adds a description of a preliminary background (e.g., a monochrome, neutral-color background) with respect to the object to the text prompt to obtain the preliminary text prompt. Examples of a preliminary text prompt generated based on text description 1205 ("lemon splashing in water") include "lemon splashing in water isolated on a gray background" and "lemon splashing in water against a gray background".

According to some aspects, image generation model generates a preliminary image (such as preliminary image 1210) based on the text description or the preliminary text prompt. In some cases, the preliminary image includes the object displayed against the preliminary background. In some cases, the image generation model generates the preliminary image using a reverse diffusion process described with reference to FIGS. 9 and 14, where the reverse diffusion process is guided by the text description or the preliminary text prompt. In the example of FIG. 12, preliminary image 1210 is generated based on a preliminary text prompt such as "lemon splashing in water isolated on a gray background", and depicts a lemon splashing in water isolated on a gray background.

According to some aspects, a color analysis component (such as the color analysis component described with reference to FIGS. 7-8) analyzes the preliminary image to choose a color for the keyable background that does not conflict with the object, as a conflicting color could render a matting algorithm useless. For example, wearing a green shirt against a green screen may cause a torso to disappear in an output image. In some cases, to find an appropriate color for a given keyable background, the color analysis component creates a color histogram for the preliminary image (such as color histogram 1215), e.g., a histogram of hues of pixels in the preliminary image weighted by saturation. In some cases, the color analysis component smooths the color histogram with a Gaussian kernel. In some cases, the Gaussian kernel has a $\sigma=10°$. In some cases, the color analysis component quantizes the color histogram into regions representing named colors (e.g. green, blue, etc.) and returns the color name as a text string, where the text string representing the hue will be used to generate the image. In the example of FIG. 12, the color analysis component identifies a violet hue as being a least common hue in preliminary image 1210, and outputs a text string "violet" in response.

According to some aspects, the prompt generation component augments the text description using the text string to obtain the text prompt. For example, in some cases, the prompt generation component obtains the text prompt according to "[text description] isolated on a solid [text string] background", "[text description] against a solid [text string] background", or the like. According to some aspects, the prompt generation component obtains the text prompt by replacing the description of the preliminary background in the preliminary text prompt with a description of the keyable background using the text string (e.g., by replacing "[text description] isolated against a solid [neutral monochrome color] background" with "[text description] isolated against a solid [text string] background", or the like). In the example of FIG. 12, text prompt 1220 includes "lemon splashing in water isolated on a solid violet background".

According to some aspects, the image generation model generates an image (such as image 1225) (e.g., a keyable image) based on the text prompt. In the example of FIG. 12, image 1225 depicts a lemon splashing in water isolated on a solid violet background. In some cases, the image includes a constant, bright, and saturated background color. In some cases, the image omits objects or gradients in the keyable background. In some cases, the image includes fine details, such as hair, fur, and/or transparencies in the object. In some cases, the image does not include color spill, or include background colors tinting the object. Accordingly, in some cases, the image is keyable.

According to some aspects, a matting component (such as the matting component described with reference to FIGS. 7-8) performs a set of matting algorithms on the image to obtain a set of candidate alpha images (such as first candidate alpha image 1230 and second candidate alpha image 1235, each shown with a depiction of a corresponding alpha matte). In some cases, each of the set of matting algorithms replaces the keyable background with an alpha channel. Accordingly, in some cases, each of the candidate alpha images includes a transparent background and an opaque or semi-opaque object.

In some cases, the set of matting algorithms includes one or more of a pixel-based chroma key algorithm, a deep-learning based chromakey model, and an object selection algorithm. In some cases, the pixel-based chroma key method takes the keyable background RGB color per pixel as input, conservatively deletes the foreground object, and inpaints the background using a flood fill to provide the background color at each pixel, allowing the algorithm to better handle subtle gradients in the background color and to perform color decontamination. In some cases, the deep-learning based chromakey model is trained on a dataset including an input RGB image and a background RGB image. In some cases, the deep-learning based chromakey method returns the alpha channel and the object. In some cases, the object selection algorithm identifies the object and the keyable background using segmentation.

In some cases, one or more of the set of matting algorithms computes an alpha image $I=\alpha F+(1-\alpha)B$, where $\alpha$ is the alpha channel and F is a pure foreground color of a pixel of an object with the keyable background B removed. In some cases, the matting component includes a selection component. In some cases, the selection component identifies a best candidate alpha image (e.g., an alpha image including a most accurate alpha channel) as the alpha image (such as alpha image 1240, shown with a depiction of a corresponding alpha matte).

In some cases, the different matting algorithms may produce similar candidate alpha images depending upon the image. In some cases, a similarity between the similar candidate alpha images is an indication that the candidate alpha images are of a high quality. In some cases, a similarity between two or more alpha candidate images is measured according to a similarity score metric which takes into account both an alpha value and RGB values of the two or more alpha candidate images, but does not penalize differences in RGB values if the alpha values are low.

In some cases, to determine the similarity score metric, the selection component composites the two or more alpha images on black and white backgrounds, takes a mean similarity between the composited images, and measures the mean similarity according to a multi-scale structural image similarity metric. The multi-scale structural image similarity metric measures a similarity between images on a scale from 0 to 1, assuming pixel values of the images are also between 0 and 1. In some cases, given three RGBA images $I_0$, $I_1$, $I_2$, a white composite image W, and black composite image B, a composition function $\mathcal{C}$, and the multi-scale structural image similarity metric function $\mathcal{M}$, the selection component computes a similarity score $S=\min_{(a,b)}\mathcal{F}(I_a, I_b)$, where $a,b\in\{0,1,2\}$ and $$\mathcal{F}(I_a, I_b) = \frac{1}{2}(\mathcal{M}[C(I_a, W), C(I_b, W)] + \mathcal{M}[C(I_a, B), C(I_b, B)]).$$

Figure 16:
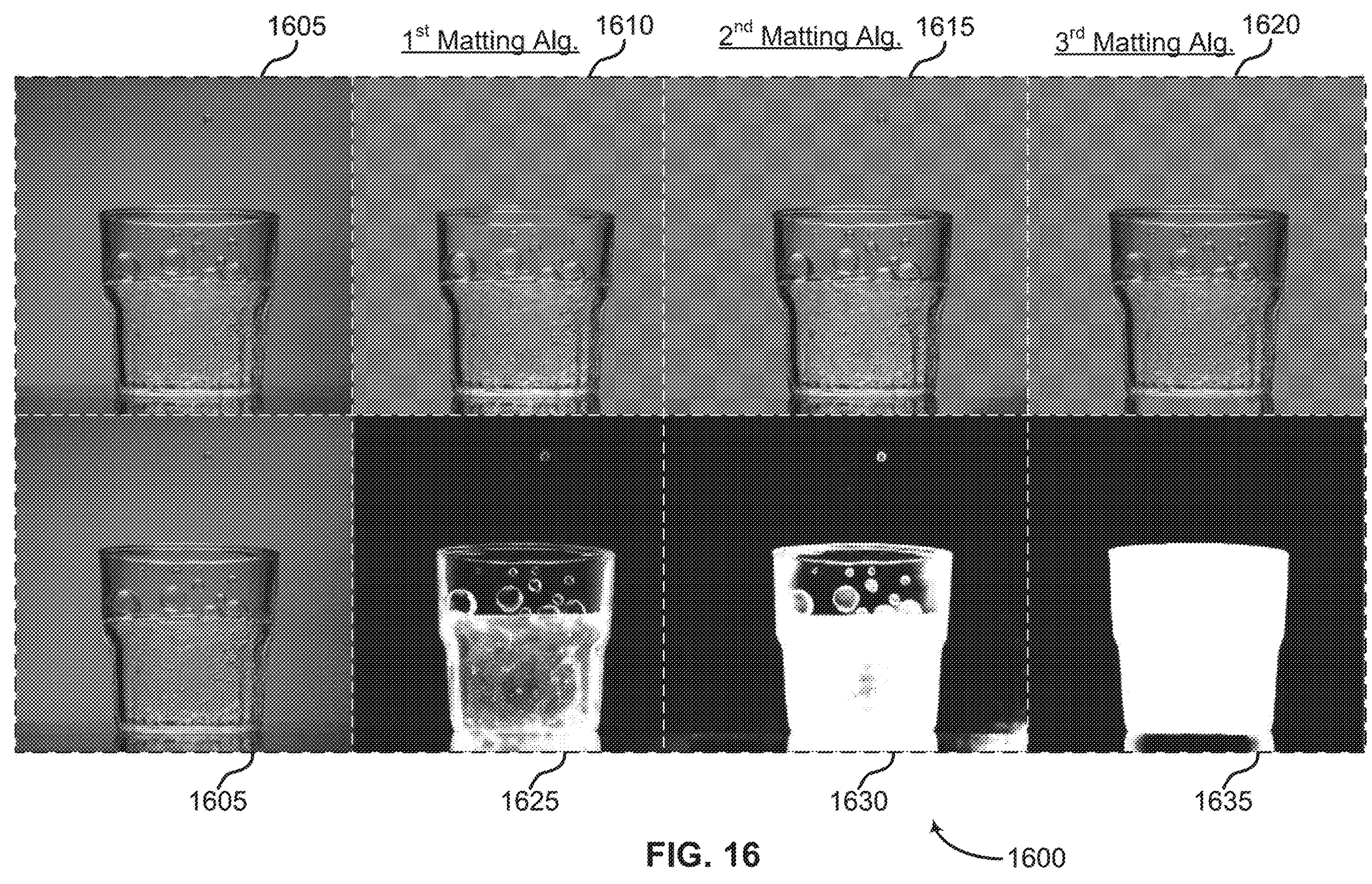
FIG. 16 shows an example of candidate alpha images having a low similarity score according to aspects of the present disclosure.
Figure 17:
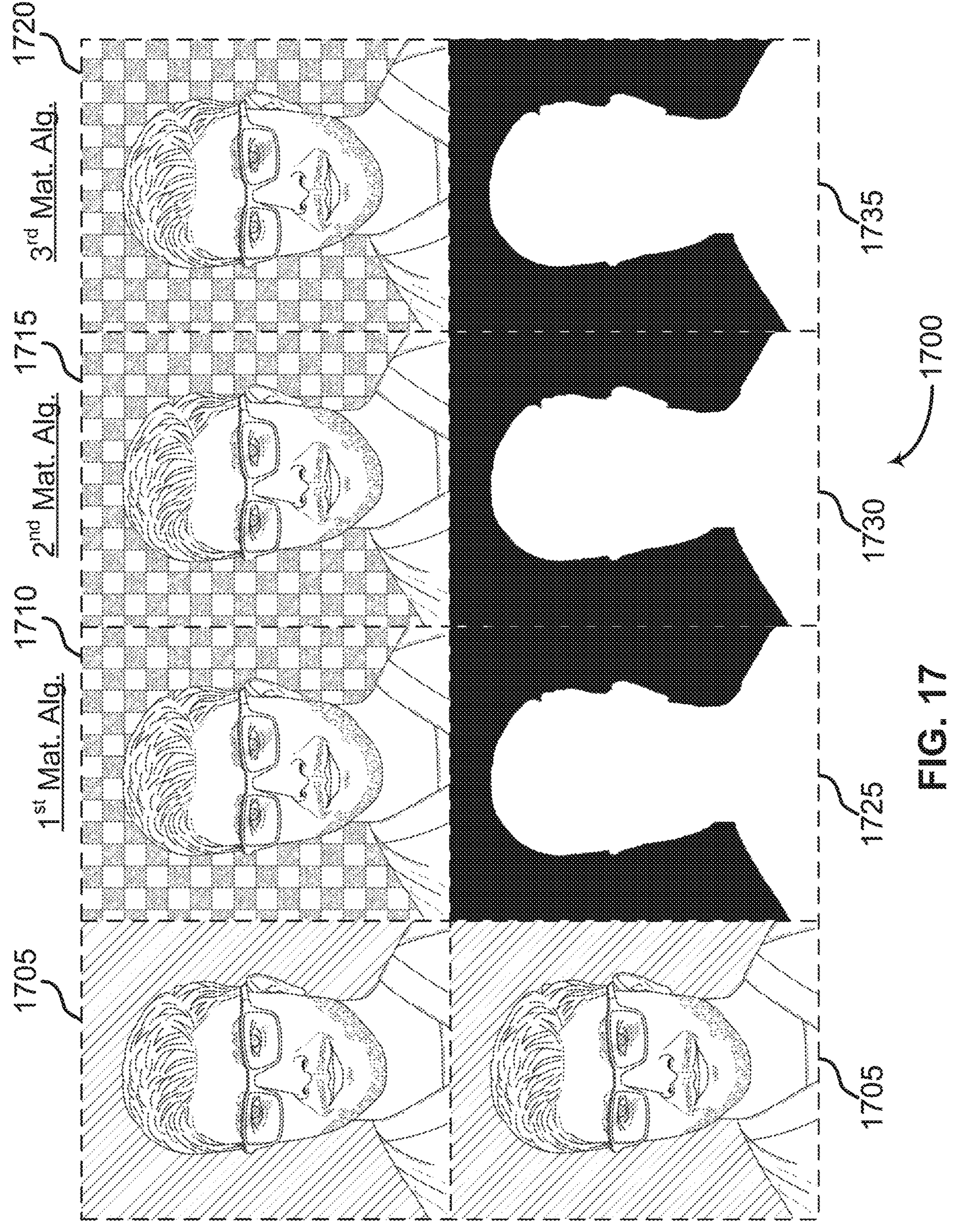
FIG. 17 shows an example of candidate alpha images having a high similarity score according to aspects of the present disclosure.

Examples of similarity scores with respect to candidate alpha images are provided with reference to FIGS. 16-17. In some cases, where a similarity score for the two or more candidate alpha images is high, the selection component selects a candidate alpha image produced by the pixel-based chroma key algorithm as the alpha image.

According to some aspects, the selection component uses a verification model (such as the verification model described with reference to FIG. 7) trained to label the alpha image to score each candidate alpha image, and selects the highest-scoring candidate alpha image as the alpha image. In some cases, the verification model is trained as described with reference to FIG. 18.

Figure 13:
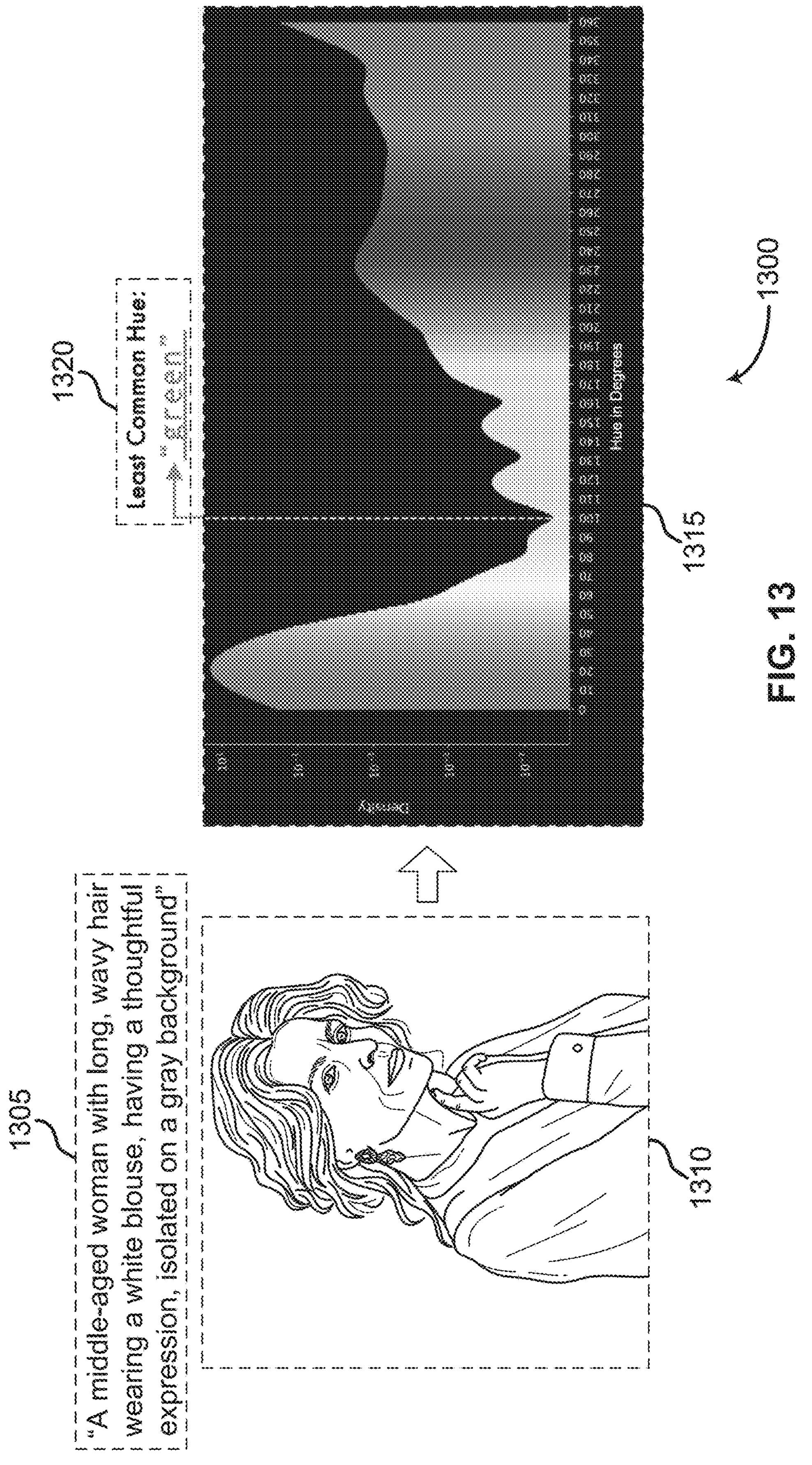
FIG. 13 shows an example of selecting a least common hue according to aspects of the present disclosure.

FIG. 13 shows an example 1300 of selecting a least common hue according to aspects of the present disclosure. The example shown includes preliminary text prompt 1305, preliminary image 1310, color histogram 1315, and description of keyable background 1320.

Preliminary text prompt 1305 is an example of, or includes aspects of, the corresponding element described with reference to FIG. 8. Preliminary image 1310 is an example of, or includes aspects of, the corresponding element described with reference to FIGS. 8 and 12. Color histogram 1315 is an example of, or includes aspects of, the corresponding element described with reference to FIG. 12. Description of keyable background 1320 is an example of, or includes aspects of, the corresponding element described with reference to FIG. 8.

Referring to FIG. 13, preliminary image 1310 is generated based on preliminary text prompt 1305, and depicts a woman isolated on a gray background. A color analysis component (such as the color analysis component described with reference to FIGS. 7-8) generates color histogram 1315 by analyzing preliminary image 1310, and determines from color histogram 1315 that a shade of green is a least common hue in preliminary image 1310. The color analysis component outputs description of keyable background 1320 including a text string "green". A prompt generation component (such as the prompt generation component described with reference to FIGS. 7-8) uses the text string "green" to generate a text prompt for generating a keyable image (such as the image described with reference to FIGS. 5, 8-9, 12, and 14-17).

Figure 14:
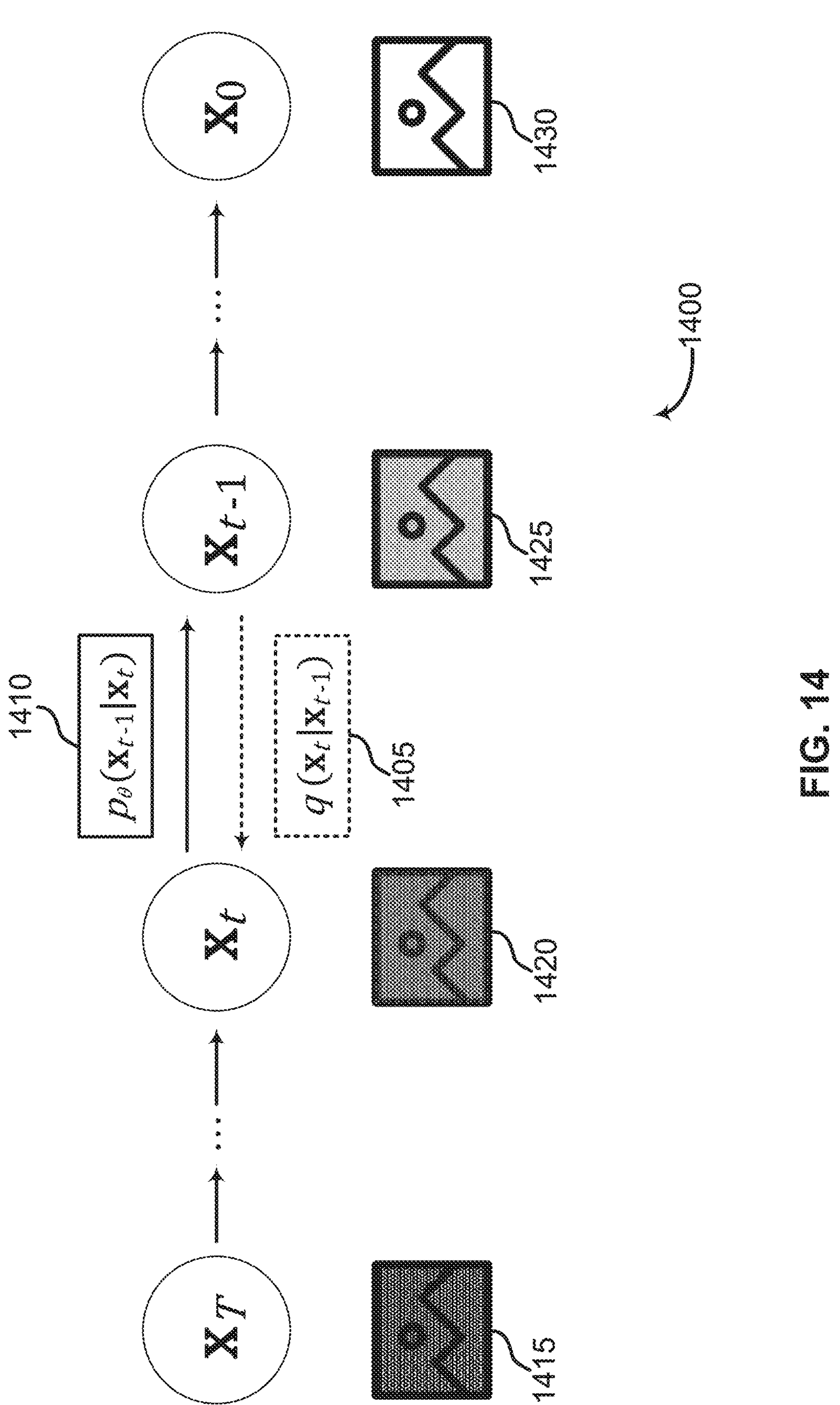
FIG. 14 shows an example of diffusion processes according to aspects of the present disclosure.

FIG. 14 shows an example 1400 of diffusion processes according to aspects of the present disclosure. The example shown includes forward diffusion process 1405 (such as the forward diffusion process described with reference to FIGS. 9 and 19) and reverse diffusion process 1410 (such as the reverse diffusion process described with reference to FIGS. 9 and 19). In some cases, forward diffusion process 1405 adds noise to an image (or image features in a latent space). In some cases, reverse diffusion process 1410 denoises the image (or image features in the latent space) to obtain a denoised image.

According to some aspects, an image generation apparatus (such as the image generation apparatus described with reference to FIGS. 1, 7-8, and 21) uses forward diffusion process 1405 to iteratively add Gaussian noise to an input at each diffusion step t according to a known variance schedule $0<\beta_1<\beta_2< \dots <\beta_T<1$:

$$q(x_t|x_{t-1}) = \mathcal{N}(x_t; \sqrt{1-\beta_t}\, x_{t-1}, \beta_t I) \tag{1}$$

According to some aspects, the Gaussian noise is drawn from a Gaussian distribution with mean $\mu_t=\sqrt{1-\beta_t}x_{t-1}$ and variance $\sigma^2=\beta_t\geq 1$ by sampling $\epsilon\sim\mathcal{N}(0, I)$ and setting $x_t=\sqrt{1-\beta_t}x_{t-1}+\sqrt{\beta_t}\epsilon$. Accordingly, beginning with an initial input $x_0$, forward diffusion process 1405 produces $x_1, \dots, x_t, \dots x_T$, where $x_T$ is pure Gaussian noise.

In some cases, an observed variable $x_0$ (such as original image 1430) is mapped in either a pixel space or a latent space to intermediate variables $x_1, \dots, x_T$ using a Markov chain, where the intermediate variables $x_1, \dots, x_T$ have a same dimensionality as the observed variable $x_0$. In some cases, the Markov chain gradually adds Gaussian noise to the observed variable $x_0$ or to the intermediate variables $x_1, \dots, x_T$, respectively, to obtain an approximate posterior $q(x_{1:T}|x_0)$.

According to some aspects, during reverse diffusion process 1410, a diffusion model (such as the image generation model described with reference to FIGS. 7-8 or the additional image generation model described with reference to FIG. 7) gradually removes noise from $x_T$ to obtain a prediction of the observed variable $x_0$ (e.g., a representation of what the diffusion model thinks the original image 1430 should be). In some cases, the prediction is influenced by a guidance prompt or a guidance vector (for example, a prompt or a prompt embedding described with reference to FIG. 9). A conditional distribution $p(x_{t-1}|x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $p_\theta(x_{t-1}|x_t)$ of the conditional distribution $p(x_{t-1}|x_t)$:

$$p_\theta(x_{t-1}|x_t) = \mathcal{N}(x_{t-1}; \mu_\theta(x_t, t), \Sigma_\theta(x_t, t)) \tag{2}$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1410 with noisy data $x_T$ (such as noisy image 1415). According to some aspects, the diffusion model iteratively denoises the noisy data $x_T$ to obtain the conditional probability distribution $p_\theta(x_{t-1}|x_t)$. For example, in some cases, at each step t−1 of reverse diffusion process 1410, the diffusion model takes $x_t$ (such as first intermediate image 1420) and t as input, where t represents a step in a sequence of transitions associated with different noise levels, and iteratively outputs a prediction of $x_{t-1}$ (such as second intermediate image 1425) until the noisy data $x_T$ is reverted to a prediction of the observed variable $x_0$ (e.g., a predicted image for original image 1430).

According to some aspects, a joint probability of a sequence of samples in the Markov chain is determined as a product of conditionals and a marginal probability:

$$x_T : p_\theta(x_{0:T}) := p(x_T)\prod_{t=1}^{T} p_\theta(x_{t-1} \mid x_T) \tag{3}$$

In some cases, $p(x_T)=\mathcal{N}(x_T; 0, I)$ is a pure noise distribution, as reverse diffusion process 1410 takes an outcome of forward diffusion process 1405 (e.g., a sample of pure noise $x_T$) as input, and $$\prod_{t=1}^{T} p_\theta(x_{t-1}|x_t)$$

represents a sequence of Gaussian transitions corresponding to a sequence of addition of Gaussian noise to a sample.

Figure 15:
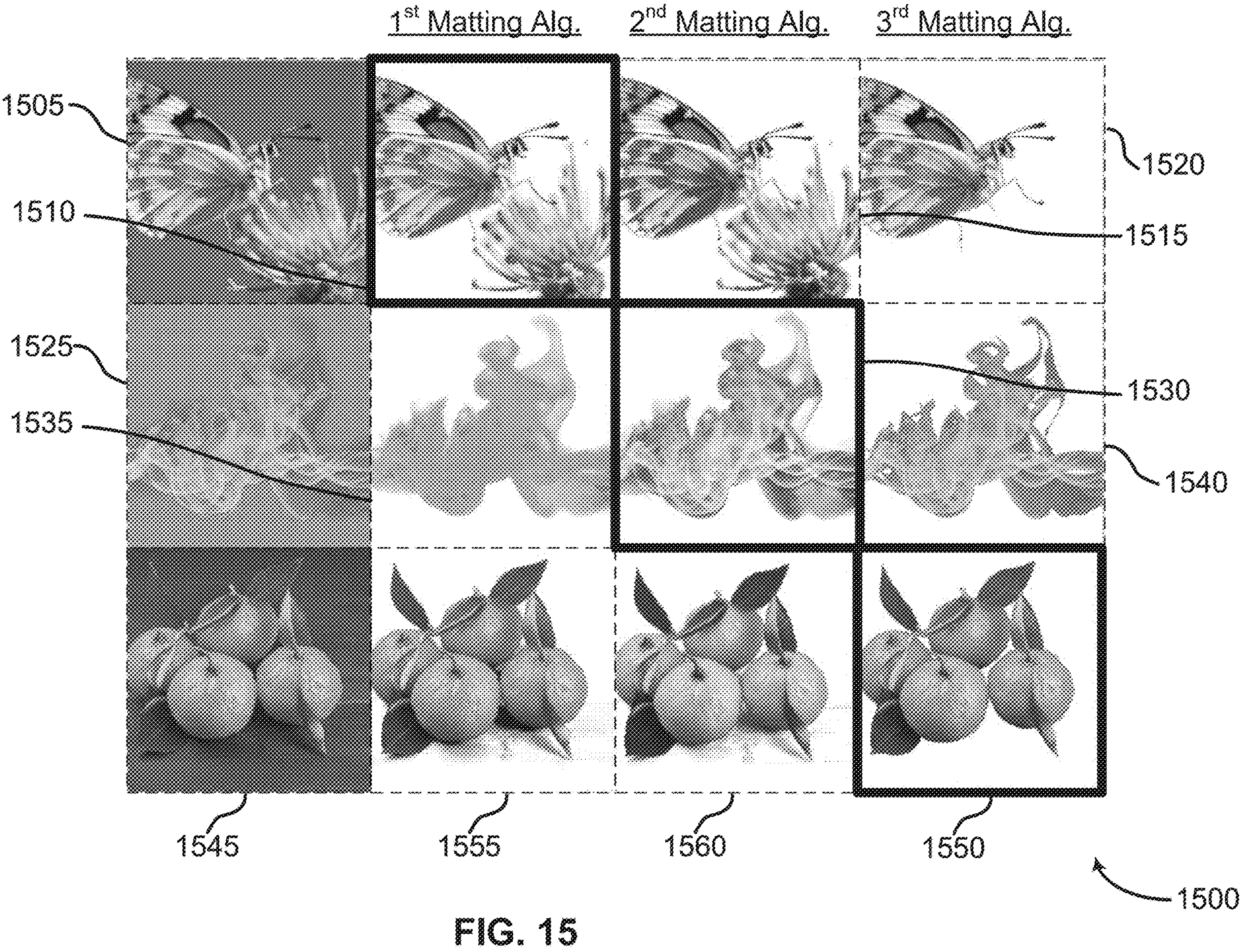
FIG. 15 shows an example of selecting alpha images according to aspects of the present disclosure.

FIG. 15 shows an example 1500 of selecting alpha images according to aspects of the present disclosure. The example shown includes first image 1505, first alpha image 1510, first candidate alpha image 1515, second candidate alpha image 1520, second image 1525, second alpha image 1530, third candidate alpha image 1535, fourth candidate alpha image 1540, third image 1545, third alpha image 1550, fifth candidate alpha image 1555, and sixth candidate alpha image 1560.

First image 1505, second image 1525, and third image 1545 are examples of, or includes aspects of, the corresponding elements described with reference to FIGS. 5, 8-9, 12, 14, and 16-17. First alpha image 1510, second alpha image 1530, and third alpha image 1550 are examples of, or includes aspects of, the corresponding elements described with reference to FIGS. 3-4, 8, and 12. First candidate alpha image 1515, second candidate alpha image 1520, third candidate alpha image 1535, fourth candidate alpha image 1540, fifth candidate alpha image 1555, and sixth candidate alpha image 1560 are examples of, or includes aspects of, the corresponding elements described with reference to FIGS. 12 and 16-17.

Referring to FIG. 15, each of first image 1505, second image 1525, and third image 1545 depict an object isolated on a keyable background (here, monochrome colors). A set of three matting algorithms each produces a respective candidate alpha image for each of first image 1505, second image 1525, and third image 1545. In the example of FIG. 15, a selection component (such as the selection component described with reference to FIG. 7) selects a candidate alpha image produced by the first matting algorithm (first alpha image 1510) as the alpha image for first image 1505, selects a candidate alpha image produced by the second matting algorithm (second alpha image 1530) as the alpha image for second image 1525, and selects a candidate alpha image produced by the third matting algorithm (third alpha image 1550) as the alpha image for third image 1545. Each of first alpha image 1510, second alpha image 1530, and third alpha image 1550 depict objects respectively depicted in first image 1505, second image 1525, and third image 1545 isolated against a transparent background.

FIG. 16 shows an example 1600 of an example of candidate alpha images having a low similarity score according to aspects of the present disclosure. The example shown includes image 1605, first candidate alpha image 1610, second candidate alpha image 1615, third candidate alpha image 1620, first alpha matte 1625, second alpha matte 1630, and third alpha matte 1635.

Image 1605 is an example of, or includes aspects of, the corresponding element described with reference to FIGS. 5, 8-9, 12, 14-15, and 17. First candidate alpha image 1610, second candidate alpha image 1615, and third candidate alpha image 1620 are examples of, or includes aspects of, the corresponding elements described with reference to FIGS. 12, and 15, and 17. First alpha matte 1625, second alpha matte 1630, and third alpha matte 1635 are examples of, or include aspects of, the corresponding elements described with reference to FIGS. 3-4, 12, and 17.

In the example of FIG. 16, image 1605 depicts a glass of carbonated water isolated on a purple background, and first candidate alpha image 1610, second candidate alpha image 1615, and third candidate alpha image 1620 depict glasses of water on backgrounds having varying degrees of transparency. A selection component (such as the selection component described with reference to FIG. 7) determines that a similarity score for first candidate alpha image 1610, second candidate alpha image 1615, and third candidate alpha image 1620 for image 1605 is 0.802, which in some cases is a low score. A differing amount of detail is visible in each of first alpha matte 1625, second alpha matte 1630, and third alpha matte 1635.

FIG. 17 shows an example 1700 of an example of candidate alpha images having a high similarity score according to aspects of the present disclosure. The example shown includes image 1705, first candidate alpha image 1710, second candidate alpha image 1715, third candidate alpha image 1720, first alpha matte 1725, second alpha matte 1730, and third alpha matte 1735.

Image 1705 is an example of, or includes aspects of, the corresponding element described with reference to FIGS. 5, 8-9, 12, and 14-16. First candidate alpha image 1710, second candidate alpha image 1715, and third candidate alpha image 1720 are examples of, or includes aspects of, the corresponding elements described with reference to FIGS. 12 and 15-16. First alpha matte 1725, second alpha matte 1730, and third alpha matte 1735 are examples of, or include aspects of, the corresponding elements described with reference to FIGS. 3-4, 12, and 16.

In the example of FIG. 17, image 1705 depicts a man isolated on a green background, and first candidate alpha image 1710, second candidate alpha image 1715, and third candidate alpha image 1720 depict men isolated on transparent backgrounds. A selection component (such as the selection component described with reference to FIG. 7)

determines that a similarity score for first candidate alpha image 1710, second candidate alpha image 1715, and third candidate alpha image 1720 for image 1705 is 0.995, which in some cases is a high score. A similar amount of detail is visible in each of first alpha matte 1725, second alpha matte 1730, and third alpha matte 1735.

Training

A method for image generation is described with reference to FIGS. 18-20. One or more aspects of the method include creating a training dataset including a training image and a training prompt, wherein the training image depicts an object and a keyable background and training an image generation model to generate images with keyable backgrounds based on the training image and the training prompt.

Some examples of the method further include obtaining a text description of the object. Some examples further include generating the training prompt based on the text description and a description of the keyable background.

Some examples of the method further include creating an additional training dataset using the trained image generation model, wherein the additional training dataset includes an alpha image having an alpha channel. In some aspects, creating the additional training dataset comprises performing a matting algorithm to replace the keyable background with the alpha channel.

Some examples of the method further include training an additional image generation model based on the additional training dataset. Some examples of the method further include training a verification model to label alpha images using the additional training dataset.

Figure 18:
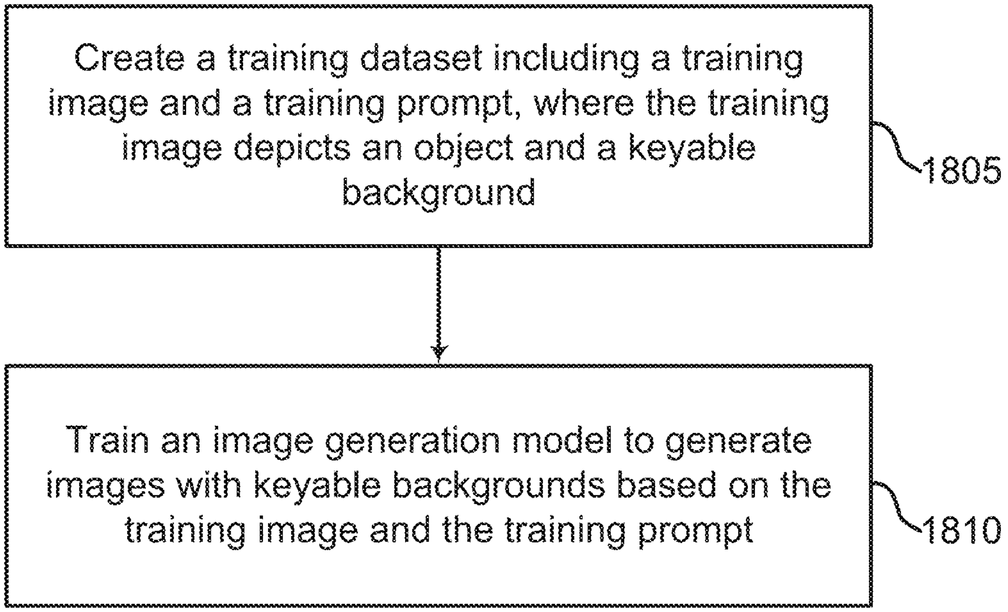
FIG. 18 shows an example of training a machine learning model according to aspects of the present disclosure.

FIG. 18 shows an example of a method 1800 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 18, an image generation apparatus (such as the image generation apparatus described with reference to FIGS. 1, 7-8, and 21) trains an image generation model (such as the image generation model described with reference to FIGS. 7-8) to generate images with keyable backgrounds based on the training image and the training prompt, where the training image depicts an object and a keyable background. Conventional image generation models do not consistently produce images including a keyable background. For example, conventional image generation models tend to generate backgrounds that are too dark, desaturated, or graded to be identified and removed using a removal algorithm that works on the basis of color identification, or tend to generate backgrounds that are insufficiently color-isolated from a target object, or tend to generate images that include additional unwanted background objects in addition to a target object.

Conventional image generation models do not handle use cases in which a user wants to generate an image including an object and an accurate alpha channel. For example, a user may want to guide the generation of an image with not only a text prompt but also with an accurate alpha mask. While segmentation maps have been used to guide diffusion models, the segmentation maps are rough and do not contain precise details (such as human hair) or transparencies (such as in a wine glass). The inability of current methods to address a direct generation of alpha images using an image generation model may be due to a lack of training data. While many large-scale segmentation training datasets exist, the existing training datasets do not include accurate soft boundaries, in some cases because the existing training datasets include data that is segmented manually using boundary-tracing tools. Matting datasets exist that contain high-quality alpha ground-truths, but are too small for training image generation models due to a difficulty in obtaining the ground-truth alpha. Without a suitable large-scale alpha dataset, training image generation models with accurate boundaries is difficult.

According to some aspects, because the image generation model is capable of generating an image having a keyable background, the image may be used to generate an alpha image (e.g., an image including an object isolated on a transparent background). In some cases, because the alpha image is generated based on the output of an image generation model, a large quantity of alpha images suitable for training a downstream image generation model for downstream image generation tasks can be produced.

At operation 1805, the system creates a training dataset including a training image and a training prompt, where the training image depicts an object and a keyable background. In some cases, the operations of this step refer to, or may be performed by, a training component as described with reference to FIG. 7. In some cases, creating a training set can include obtaining a preexisting set of training data for training the machine learning model. For example, in some cases, the training component collects the training image and the training prompt for the training dataset from a database (such as the database described with reference to FIG. 1), from another data source (such as the Internet), or from a user. In some cases, the training image depicts an object (e.g., a foreground element) isolated on the keyable background. In some cases, the keyable background comprises a monochrome color. In some cases, the keyable background consists of a monochrome color.

In some cases, the training prompt describes the object and the keyable background with respect to each other. An example training prompt is "a lemon splashing in water isolated on a violet background". According to some aspects, a prompt generation component (such as the prompt generation component described with reference to FIGS. 7-8) obtains a text description of the object. According to some aspects, the prompt generation component generates the training prompt based on the text description and a description of the keyable background. In some cases, the prompt generation component retrieves one or more of the text description from the database, the other data source, or the user. In some cases, a color analysis component (such as the color analysis component) generates a text string including the description of the keyable background by analyzing the training image in a similar manner as described with reference to FIGS. 12-13.

At operation 1810, the system trains an image generation model to generate images with keyable backgrounds based on the training image and the training prompt. In some cases, the operations of this step refer to, or may be performed by, a training component as described with reference to FIG. 7.

According to some aspects, the image generation model generates an image based on the training text prompt (for example, using a reverse diffusion process as described with reference to FIGS. 9, 14, and 19). In some cases, the training component determines a loss according to a loss function based on a comparison of the image and the training image.

A loss function refers to a function that impacts how a machine learning model is trained in a supervised learning model. For example, during each training iteration, the output of the machine learning model is compared to the known annotation information in the training data. The loss function provides a value (the "loss") for how close the predicted annotation data is to the actual annotation data. After computing the loss, the parameters of the model are updated accordingly and a new set of predictions are made during the next iteration.

Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). In some cases, a supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples. In some cases, the training component updates image generation parameters of the image generation model based on the loss. In some cases, the training component trains the image generation model as described with reference to FIG. 19.

According to some aspects, the training component creates an additional training dataset using the trained image generation model. In some cases, the additional training dataset includes an alpha image having an alpha channel. For example, in some cases, the trained image generation model generates an image as described with reference to FIGS. 11-17, and a matting component (such as the matting component described with reference to FIGS. 7-8) generates the alpha image based on the image as described with reference to FIGS. 11-17. According to some aspects, a set of candidate alpha images are generated using a set of matting algorithms, and one of the set of candidate alpha images is selected by a selection component (such as the selection component described with reference to FIG. 7) as the alpha image, as described with reference to FIGS. 11-17.

According to some aspects, the training component obtains a ground-truth label for the alpha image. In some cases, the ground truth label is provided by a user. In some cases, a verification model (such as the verification model described with reference to FIG. 7) generates a label for the alpha image, where the label indicates a prediction of a degree of quality of the alpha image. In some cases, the training component determines a verification loss based on a comparison of the label and the ground-truth label and updates parameters of the verification model based on the verification loss.

According to some aspects, the training component trains an additional image generation model (such as the additional image generation model described with reference to FIG. 7) based on the additional training dataset. For example, in some cases, the prompt generation component generates an additional training prompt by modifying the text prompt for the alpha image. An example of an additional training prompt is "a lemon splashing in water isolated on a transparent background". In some cases, the additional image generation model generates an additional image based on the additional training prompt. In some cases, the training component compares the additional image to the alpha image (e.g., an additional training image). In some cases, the training component updates the parameters of the additional image generation model based on the comparison (for example, by backpropagating a loss).

In some cases, the training component conditions the additional image generation model to generate an additional image using an alpha matte as guidance. In some cases, the training component composites the alpha image onto a gray background, as gray is a neutral color that will not shift a hue of the object, and derives a pure foreground color $$F = \frac{1}{\alpha}(I - G) + G,$$

where G is the color of the gray background. In some cases, the training component provides an alpha matte of the alpha image and the pure foreground color F as guidance during an additional image generation process. In some cases, the training component updates the parameters of the additional image generation process based on a result of the additional image generation process. A comparative example of an image generated using a conditioned additional image generation model is described with reference to FIG. 20.

Figure 19:
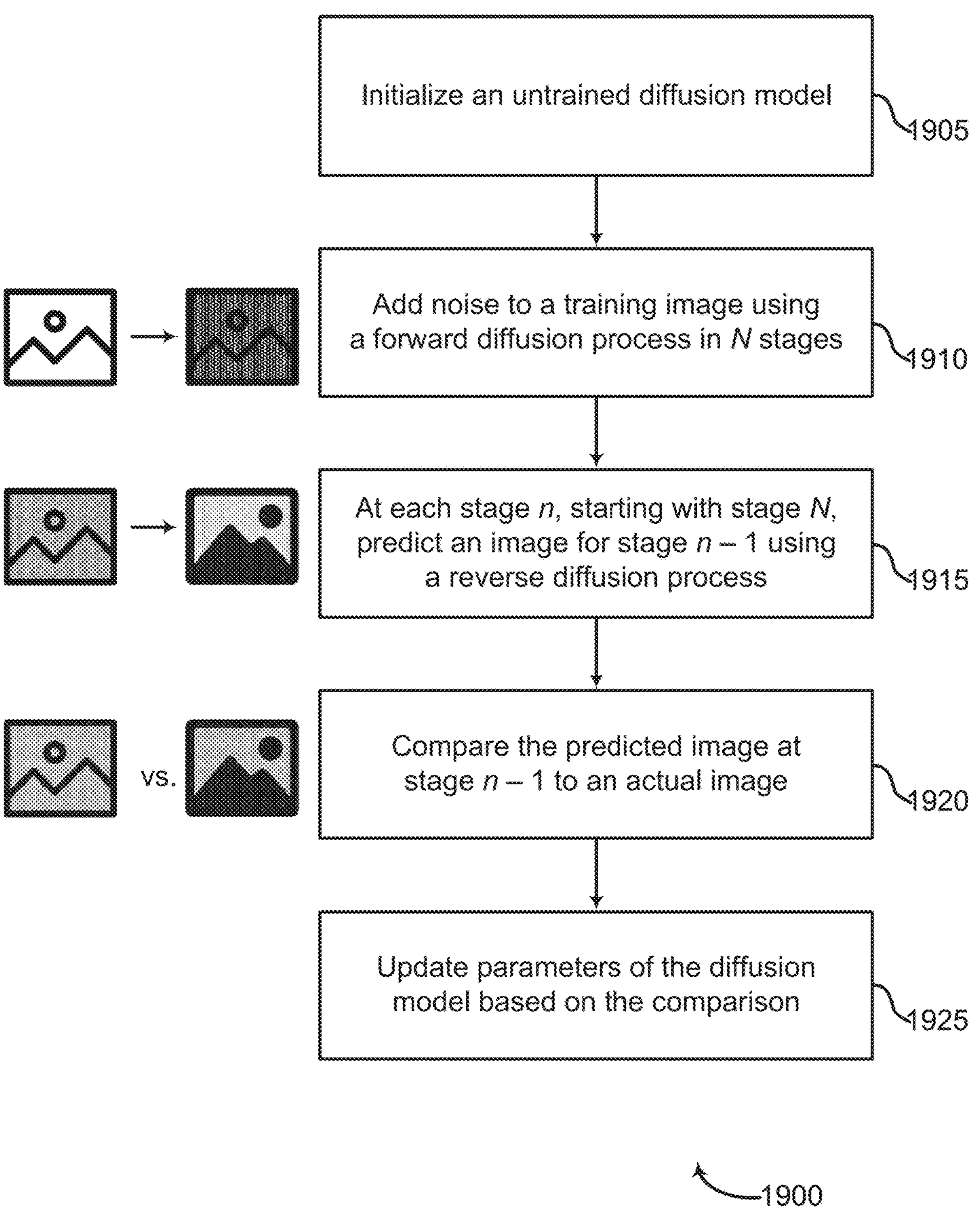
FIG. 19 shows an example of training a diffusion model according to aspects of the present disclosure.

FIG. 19 shows an example of a method 1900 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 19, according to some aspects, a training component (such as the training component described with reference to FIG. 7) trains a diffusion model (such as the image generation model described with reference to FIGS. 7-8 or the additional image generation model described with reference to FIG. 7) to generate an image.

At operation 1905, the system initializes the diffusion model. In some cases, the operations of this step refer to, or may be performed by, a training component as described with reference to FIG. 7. In some cases, the initialization includes defining the architecture of the diffusion model and establishing initial values for parameters of the diffusion model. In some cases, the training component initializes the diffusion model to implement a U-Net architecture (such as the U-Net architecture described with reference to FIG. 10). In some cases, the initialization includes defining hyperparameters of the architecture of the diffusion model, such as a number of layers, a resolution and channels of each layer block, a location of skip connections, and the like.

At operation 1910, the system adds noise to a training image (or an additional training image) using a forward diffusion process (such as the forward diffusion process described with reference to FIGS. 9 and 14) in N stages. In some cases, the operations of this step refer to, or may be performed by, a training component as described with reference to FIG. 7.

At operation 1915, at each stage n, starting with stage N, the system predicts an image for stage n−1 using a reverse diffusion process (such as a reverse diffusion process described with reference to FIGS. 9 and 14). In some cases, the operations of this step refer to, or may be performed by, the diffusion model. In some cases, each stage n corresponds to a diffusion step t. In some cases, at each stage n, the diffusion model predicts noise that can be removed from an intermediate image to obtain a predicted image. In some cases, an original image is predicted at each stage of the training process.

In some cases, the reverse diffusion process is conditioned on a training prompt (such as the training prompt described with reference to FIG. 18) or other guidance (such as an alpha image as described with reference to 18). In some cases, an encoder obtains the training prompt and generates guidance features in a guidance space. In some cases, at each stage, the diffusion model predicts noise that can be removed from an intermediate image to obtain a predicted image that aligns with the guidance features.

At operation 1920, the system compares the predicted image at stage n−1 to an actual image, such as the image at stage n−1 or the original input image. In some cases, the operations of this step refer to, or may be performed by, a training component as described with reference to FIG. 7. In some cases, the training component computes a loss function based on the comparison.

At operation 1925, the system updates parameters of the diffusion model based on the comparison. In some cases, the operations of this step refer to, or may be performed by, a training component as described with reference to FIG. 7. In some cases, the training component updates the machine learning parameters of the diffusion model based on the loss function. For example, in some cases, the training component updates parameters of the U-Net using gradient descent. In some cases, the training component trains the U-Net to learn time-dependent parameters of the Gaussian transitions. In some cases, the training component optimizes for a negative log likelihood.

Figure 20:
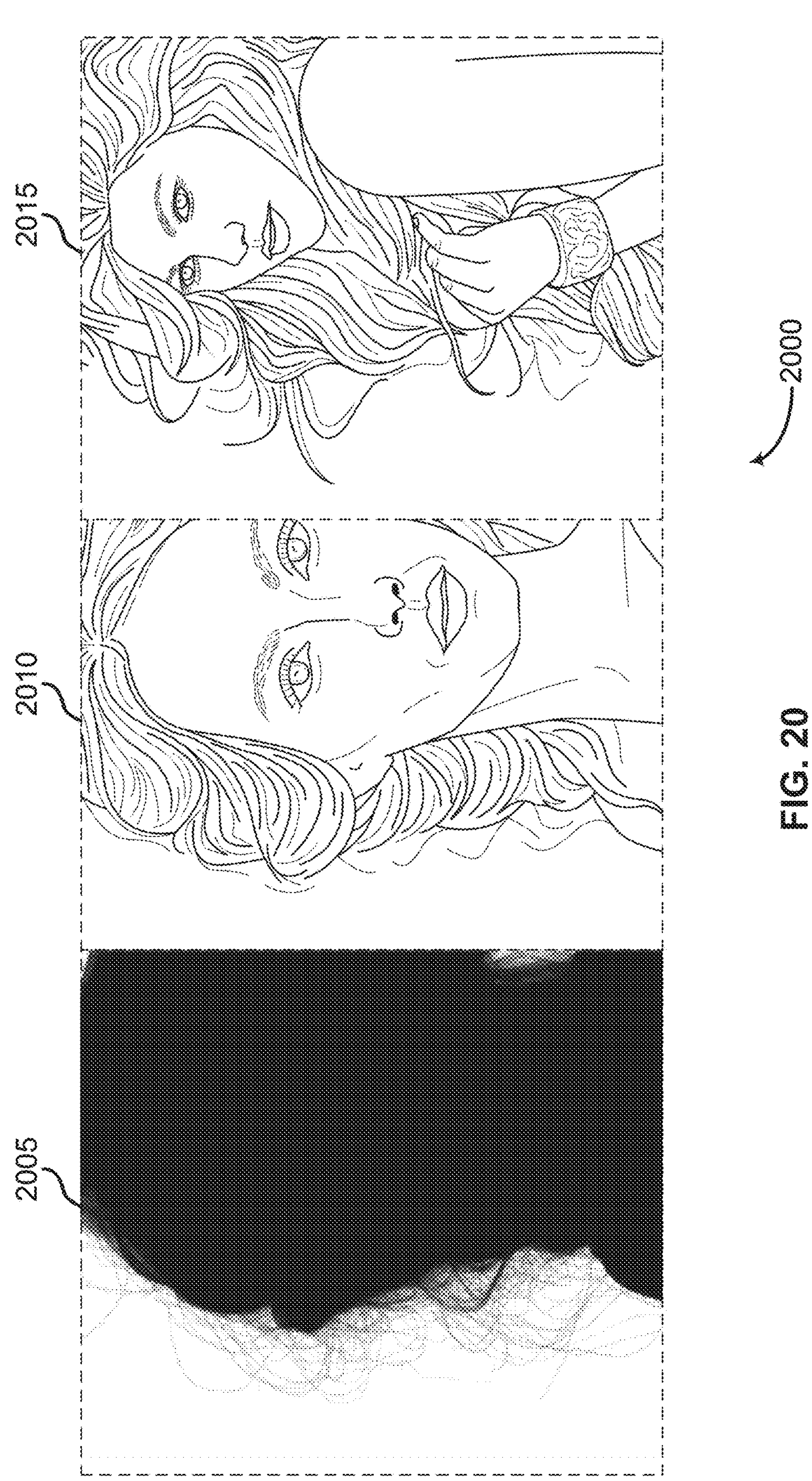
FIG. 20 shows a comparative example of an image generated using a conditioned additional image generation model according to aspects of the present disclosure.

FIG. 20 shows a comparative example 2000 of an image generated using a conditioned additional image generation model according to aspects of the present disclosure. The example shown includes alpha matte 2005, additional image 2010, and comparative image 2015. Additional image 2010 is an example of, or includes aspects of, the synthetic image described with reference to FIGS. 1 and 2. As shown in FIG. 20, the colors of alpha matte 2005 are reversed.

Referring to FIG. 20, additional image 2010 is an example of an image generated based on alpha matte 2005 by an additional image generation model (such as the additional image generation model described with reference to FIG. 7) conditioned on an alpha matte as described with reference to FIG. 18, and comparative image 2015 is an example of an image generated by a conventional image generation model based on alpha matte 2005. In the example of FIG. 20, each of additional image 2010 and comparative image 2015 are generated based on a same text prompt.

As shown in FIG. 20, because additional image 2010 is generated using the alpha matte conditioned additional image generation model, additional image 2010 closely follows the opaque area of alpha matte 2005. By contrast, comparative image 2015 does not follow the opaque area of alpha matte 2005. Accordingly, by conditioning the additional image generation model based on an alpha image as described with reference to FIG. 18, the additional image generation model is able to produce images that are more accurate to masked areas than conventional image generation models.

Figure 21:
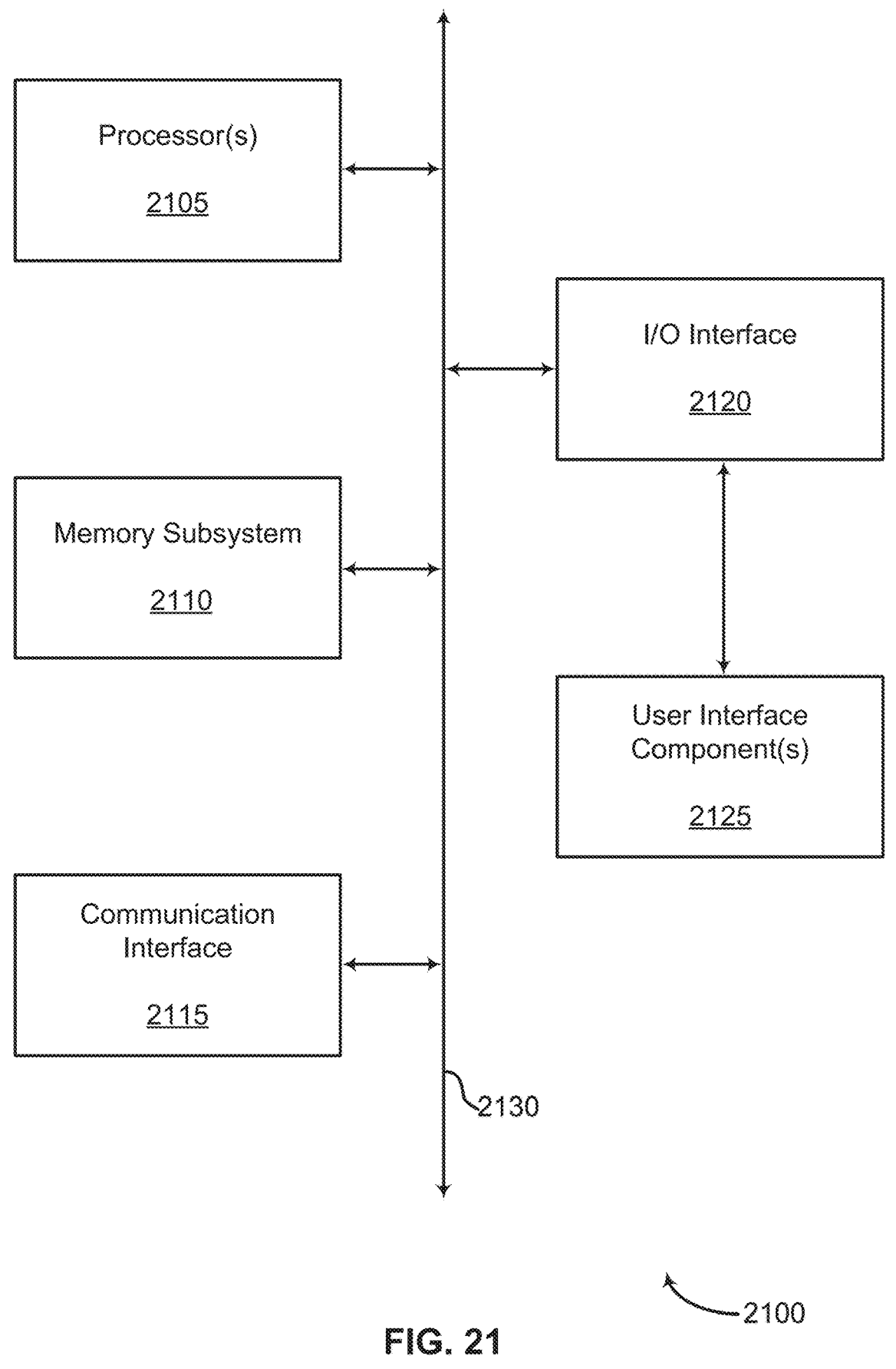

FIG. 21 shows an example of a computing device 2100 according to aspects of the present disclosure. According to some aspects, computing device 2100 includes processor(s) 2105, memory subsystem 2110, communication interface 2115, I/O interface 2120, user interface component(s) 2125, and channel 2130.

In some embodiments, computing device 2100 is an example of, or includes aspects of, the image generation apparatus described with reference to FIGS. 1 and 7-8. In some embodiments, computing device 2100 includes one or more processors 2105 that can execute instructions stored in memory subsystem 2110 to obtain text prompt describing an object and a keyable background; generate, using an image generation model, an image including the object and the keyable background based on the text prompt; and generate an alpha image by replacing the keyable background with an alpha channel.

According to some aspects, computing device 2100 includes one or more processors 2105. Processor(s) 2105 are an example of, or includes aspects of, the processor unit as described with reference to FIG. 7. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 2110 includes one or more memory devices. Memory subsystem 2110 is an example of, or includes aspects of, the memory unit as described with reference to FIG. 7. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 2115 operates at a boundary between communicating entities (such as computing device 2100, one or more user devices, a cloud, and one or more databases) and channel 2130 and can record and process communications. In some cases, communication interface 2115 is provided to enable a processing system coupled to a transceiver (e.g., a transmitter and/or a receiver). In some examples, the transceiver is configured to transmit (or send) and receive signals for a communications device via an antenna.

According to some aspects, I/O interface 2120 is controlled by an I/O controller to manage input and output signals for computing device 2100. In some cases, I/O interface 2120 manages peripherals not integrated into computing device 2100. In some cases, I/O interface 2120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2120 or via hardware components controlled by the I/O controller.

According to some aspects, user interface component(s) 2125 enable a user to interact with computing device 2100. In some cases, user interface component(s) 2125 include an audio device, such as an external speaker system, an external display device such as a display screen, an input device (e.g., a remote-control device interfaced with a user interface directly or through the I/O controller), or a combination thereof. In some cases, user interface component(s) 2125 include a GUI.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A computer-implemented method for image generation, comprising:

obtaining a preliminary text prompt describing an object;

generating, by an image generation model, a preliminary image based on the preliminary text prompt, wherein the preliminary image depicts the object, and wherein the image generation model is a machine learning model;

determining a background color based on the preliminary image;

modifying the preliminary text prompt based on the determined background color to obtain a modified text prompt describing the object and a background having the determined background color;

generating, using the image generation model, a synthetic image based on the modified text prompt, wherein the synthetic image depicts the object and the background having the determined background color; and generating an alpha image by replacing the background with an alpha channel based on the determined background color.

2. The method of claim 1, further comprising:

determining the background color based on a color analysis of the preliminary image.

3. The method of claim 1, wherein:

the preliminary image includes a preliminary background comprising a neutral monochrome color.

4. The method of claim 1, wherein generating the alpha image comprises:

performing a matting algorithm.

5. The method of claim 1, wherein generating the alpha image comprises:

performing a plurality of matting algorithms; and selecting an output from one of the plurality of matting algorithms as the alpha image.

6. The method of claim 1, wherein:

the image generation model is trained using a training image including a training keyable background.

7. A method for image generation, comprising:

creating a training dataset by obtaining a preliminary image including an object, identifying a least common color included in the preliminary image, generating, using an image generation model, a synthetic image depicting the object and a background consisting of the least common color, generating a training alpha image by replacing the background of the synthetic image with an alpha channel, and obtaining a training prompt describing the training alpha image, wherein the image generation model is a machine learning model; and training an additional image generation model to generate alpha images based on the training alpha image and the training prompt.

8. The method of claim 7, further comprising:

obtaining a text description of the object; and generating the training prompt based on the text description and a description of the least common color.

9. The method of claim 7, further comprising:

obtaining a preliminary text prompt describing the object; and generating, by the image generation model, the preliminary image based on the preliminary text prompt.

10. The method of claim 7, wherein creating the training dataset comprises:

performing a matting algorithm to replace the background with the alpha channel.

11. The method of claim 7, wherein training the additional image generation model comprises:

generating an additional synthetic image based on the training prompt; and comparing the additional synthetic image and the training alpha image.

12. The method of claim 7, further comprising:

training a verification model to label the alpha images.

13. A system for image generation, comprising:

a memory component; and a processing device coupled to the memory component, the processing device configured to perform operations comprising:

obtaining a preliminary text prompt describing an object;

generating, by an image generation model, a preliminary image based on the preliminary text prompt, wherein the preliminary image depicts the object, and wherein the image generation model is a machine learning model;

determining a background color based on the preliminary image;

modifying the preliminary text prompt based on the determined background color to obtain a modified text prompt describing the object and a background having the determined background color;

generating, using the image generation model, a synthetic image based on the modified text prompt, wherein the synthetic image depicts the object and the background having the determined background color; and generating an alpha image by replacing the background with an alpha channel based on the determined background color.

14. The system of claim 13, the system further comprising:

a color analysis component configured to determine the background color based on a color analysis of the preliminary image.

15. The system of claim 13, further comprising:

a matting component configured to select an output from one of a plurality of matting algorithms as the alpha image.

16. The system of claim 13, the system further comprising:

a training component configured to train the image generation model using a training image including a training keyable background.

* * * * *